US009635468B2

(12) United States Patent
Aliev et al.

(10) Patent No.: US 9,635,468 B2
(45) Date of Patent: Apr. 25, 2017

(54) ENCAPSULATED THERMOACOUSTIC PROJECTOR BASED ON FREESTANDING CARBON NANOTUBE FILM

(71) Applicant: THE BOARD OF REGENTS, THE UNIVERSITY OF TEXAS SYSTEM, Austin, TX (US)

(72) Inventors: Ali E. Aliev, Dallas, TX (US); Ray H. Baughman, Dallas, TX (US)

(73) Assignee: Board of Regents, The University of Texas System, Austin, TX (US)

(*) Notice: Subject to any disclaimer, the term of this patent is extended or adjusted under 35 U.S.C. 154(b) by 15 days.

(21) Appl. No.: 14/776,257

(22) PCT Filed: Mar. 14, 2014

(86) PCT No.: PCT/US2014/027341
§ 371 (c)(1),
(2) Date: Sep. 14, 2015

(87) PCT Pub. No.: WO2014/152438
PCT Pub. Date: Sep. 25, 2014

(65) Prior Publication Data
US 2016/0037267 A1 Feb. 4, 2016

Related U.S. Application Data

(60) Provisional application No. 61/791,381, filed on Mar. 15, 2013.

(51) Int. Cl.
*H04R 25/00* (2006.01)
*H04R 23/00* (2006.01)
*B82Y 30/00* (2011.01)

(52) U.S. Cl.
CPC ............ *H04R 23/002* (2013.01); *B82Y 30/00* (2013.01); *Y10S 977/751* (2013.01); *Y10S 977/752* (2013.01); *Y10S 977/932* (2013.01)

(58) Field of Classification Search
CPC ... H04R 23/002; B82Y 30/00; Y10S 977/932; Y10S 977/752; Y10S 977/751
(Continued)

(56) References Cited

U.S. PATENT DOCUMENTS 8,019,097 B2* 9/2011 Jiang .................... H04R 23/002
381/164
2010/0046784 A1 2/2010 Jiang et al.
(Continued)

OTHER PUBLICATIONS

Officer Dana Schalinatus; International Search Report and Written Opinion; date of mailing Nov. 21, 2014; International Application No. PCT/US2014/027341; 27 pages.
(Continued)

*Primary Examiner* — Brian Ensey
(74) *Attorney, Agent, or Firm* — Dickinson Wright PLLC; Ross Spencer Garsson

(57) ABSTRACT

A suspended nanotube film (or films) producing sound by means of the thermoacoustic (TA) effect is encapsulated between two plates, at least one of which vibrates, to enhance sound generation efficiency and protect the film. To avoid the oxidation of carbon nanotubes at elevated temperatures and reduce the thermal inertia of surrounding medium the enclosure is filled with inert gas (preferably with high heat capacity ratio, $\gamma = C_p/C_v$, and low heat capacity, $C_p$). To generate sound directly as the first harmonic of applied audio signal without use of an energy consuming dc biasing, an audio signal modulated carrier frequency at much higher frequency is used to provide power input. Various other inventive means are described to provide enhanced projected sound intensity, increased projector efficiency, and lengthened projector life, like the use of infrared reflecting coatings and particles on the projector plates, non-parallel sheet alignment in sheet stacks, and cooling means on one projector side.

22 Claims, 20 Drawing Sheets

(58) Field of Classification Search
USPC .......................................................... 381/164
See application file for complete search history.

(56) References Cited

U.S. PATENT DOCUMENTS

| | | |
|---|---|---|
| 2010/0054504 A1 | 3/2010 | Jiang et al. |
| 2010/0166232 A1 | 7/2010 | Liu et al. |
| 2012/0250908 A1* | 10/2012 | Jiang .................... H04R 23/002 |
| | | 381/164 |

OTHER PUBLICATIONS

H. D. Arnold; 1. B. Crandall: "The thermophone as a precision source of sound", Phys. Rev., vol. 10, 1917, pp. 22-38, XP002728747.
Lin Xiao et al: "Flexible, Stretchable, Transparent Carbon Nanotube Thin Film Loudspeakers", Nano Letters, American Chemical Society, US, vol. 8, No. 12, Oct. 29, 2008 (Oct. 29, 2008), pp. 4539-4545, XP002534917.
Officer Dana Schalinatus; Invitation to Pay Additional Fees and, Where Applicable, Protest Fee; date of mailing Sep. 5, 2014; International Application No. PCT/US2014/027341; 12 pages.

\* cited by examiner

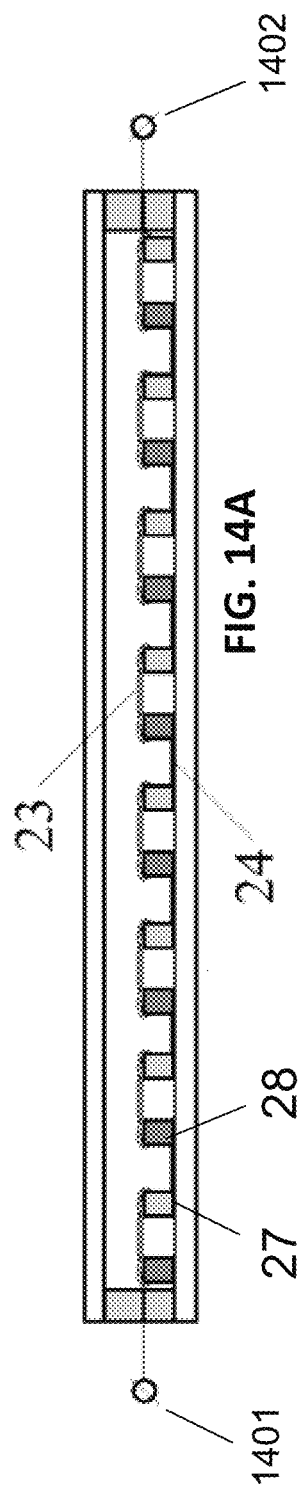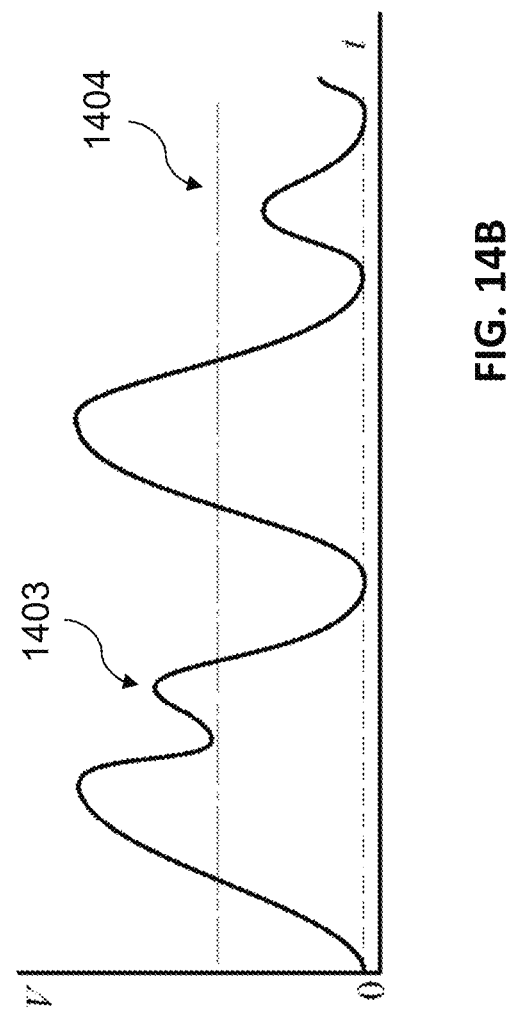
FIG. 14A
FIG. 14B

ENCAPSULATED THERMOACOUSTIC PROJECTOR BASED ON FREESTANDING CARBON NANOTUBE FILM

CROSS-REFERENCE TO RELATED PATENT APPLICATIONS

This application is the 35 U.S.C. 371 national application of International Patent Application No. PCT/US14/27341 entitled "Encapsulated Thermoacoustic Projector Based On Free-Standing Carbon Nanotube Film," filed on Mar. 14, 2014, which claims priority to U.S. Patent Appl. Ser. No. 61/791,381, filed on Mar. 15, 2013, entitled "Encapsulated Themoacoustic Projector Based On Free-Standing Carbon Nanotube Film," which patent application is commonly owned by the owner of the present invention. This patent application is hereby incorporated by reference in its entirety for all purposes.

GOVERNMENT INTEREST

This invention was made with government support under Grant No. N00014-08-1-0654 awarded by the Office of Naval Research. The government has certain rights in the invention.

FIELD OF INVENTION

The present disclosure relates generally to acoustic devices and method for generating sound waves and more specifically to an encapsulated carbon-nanotube-based thermoacoustic device and method for generating sound waves using the thermoacoustic effect. Encapsulation of carbon nanotube (CNT) film in inert gases protects the nanoscaled CNT film from harsh environment and allows application of temperatures up to 2000 K and Q times increases in the sound pressure, where Q is the resonance quality factor of the encapsulating vibrating plates.

BACKGROUND OF INVENTION

Acoustic devices generally include a signal device and a sound transducer. The signal device produces an electrical or pressure modulated input signals corresponding to the sound signal and applies it to the sound transducer. The electro-dynamic loudspeaker is an example of electro-acoustic transducer that converts electrical signals into sound.

A thermoacoustic (TA) device converts the temperature modulation on the heater to pressure waves. The thermoacoustic effect is distinct from the mechanism of the conventional loudspeaker, which the pressure waves are created by the mechanical movement of the diaphragm. When signals applied to the TA element, heating is produced in the TA element according to the variations of the signal and/or signal strength. Heat is propagated into surrounding medium. The heating of the medium causes thermal expansion and produces pressure waves in the surrounding medium, resulting in sound wave generation. Such an acoustic effect induced by temperature waves is commonly called "the thermoacoustic effect."

There are different types of electro-acoustic loudspeakers that can be categorized by their working principles, such as electro-dynamic loudspeakers, electromagnetic loudspeakers, electrostatic loudspeakers and piezoelectric loudspeakers. However, the various types ultimately use mechanical vibration to produce sound waves, in other words they all achieve "electro-mechanical-acoustic" conversion. Among the various types, the electro-dynamic loudspeakers are most widely used.

There have been several attempts to utilize thin nanoscaled films for thermoacoustic sound generation. A thermophone based on the thermoacoustic effect was created by H. D. Arnold and I. B. Crandall (H. D. Arnold and I. B. Crandall, "The thermophone as a precision source of sound," *Phys. Rev.* 10, 22-38 (1917)). They used a platinum strip with a thickness of 700 nm as a TA element. However, the thermophone adopting the platinum strip, listened to the open air, sounds extremely weak because the high thermal inertia of the platinum strip.

The following provide examples of these types of TA devices based on CNTs and photo-lithographically patterned nanowire arrays. Wide frequency response range and relatively high sound pressure level was demonstrated using free-standing CNT thin film loudspeakers [L. Xiao et al., "Flexible, stretchable, transparent carbon nanotube thin film loudspeakers," *Nanoletters* 8, 4539-4545 (2008); L. Xiao et al., "High frequency response of carbon nanotube thin film speaker in gases," *J. Appl. Phys.* 110, 084311 (2011); K. Suzuki et al., "Study of carbon-nanotube web thermoacoustic loudspeakers," *Jpn. J. Appl. Phys.* 50, 01BJ10 (2011); M. E. Kozlov et al., "Sound of carbon nanotube assemblies," *J. Appl. Phys.* 106, 124311 (2009); A. E. Aliev et al., "Underwater sound generation using carbon nanotube projectors," *Nano Lett.* 10, 2374-80 (2010)] and micro-fabricated arrays of nanowires [A. O. Niskanen et al., "Suspended metal wire array as a thermoacoustic sound source," *Appl. Phys. Lett.* 95, 163102 (2009); V. Vesterinen et al., "Fundamental efficiency of nanothermophones: modeling and experiments," *Nano Lett.* 10, 5020-24 (2010)]. In another work, thin metallic foil deposited on porous silicon pillars has been used for thermoacoustic sound generation [H. Shinoda et al., "Thermally induced ultrasonic emission from porous silicon," *Nature* 400, 853 (1999)].

The most part of patented TA devices are open type systems emitting sound directly to the open air:
1. U.S. Patent Application Publ. No. 20050201575, entitled "Thermally excited sound wave generating device," (N. Koshida et al.).
2. U.S. Pat. No. 8,019,097, entitled "Thermoacoustic device," (K. L. Jiang et al.).
3. U.S. Pat. No. 8,019,099, entitled "Thermoacoustic device," (K. L. Jiang et al.).
4. U.S. Pat. No. 8,059,841, entitled "Thermoacoustic device," (K. L. Jiang et al.).
5. U.S. Pat. No. 8,068,625, entitled "Thermoacoustic device," (K. L. Jiang et al.).
6. U.S. Pat. No. 8,073,163, entitled "Thermoacoustic device," (K. L. Jiang et al.).
7. U.S. Pat. No. 8,300,854, entitled "Thermoacoustic device," (K. L. Jiang et al.).
8. U.S. Patent Application Publ. No. 20110115844, entitled "Thermoacoustic device with flexible fastener and loudspeaker using the same," (L. Liu et al.).

Major limitations exist for the above described open type TA devices. These limitations include low applicable temperatures, sensitivity of nanoscale heaters to the environment and low sound generation efficiency in the low frequency region, where the demand for large size and flexible sound projectors is high.

Accordingly, there is a high need to provide an effective TA device working in harsh environment conditions in air and underwater in the low frequency range.

SUMMARY OF INVENTION

The present invention relates to an encapsulated thermoacoustic projector based on free-standing carbon nanotube film. (A "thermoacoustic projector" can also be referred to as a "thermoacoustic sound projector" or a "thermoacoustic sound transducer"). The suspended carbon nanotube (CNT) film (or films) producing sound by means of the thermoacoustic (TA) effect is encapsulated between two vibrating membranes (also are called plates) to enhance the sound generation efficiency and protect the film. To avoid the oxidation of carbon nanotubes at elevated temperatures and reduce the thermal inertia of surrounding medium the enclosure is filled with inert gas (preferably with high heat capacity ratio, $\gamma=C_p/C_v$, and low heat capacity, $C_p$). To generate sound directly at the first harmonic of sound signal frequencies without energy consuming dc biasing, the inventors apply a sinusoidal carrier current or voltage at a frequency much higher than the needed sound output of the sound projector and modulate the amplitude of the carrier current or voltage by using the sound signal frequencies.

In general, in one aspect, the invention features a thermoacoustic apparatus that includes a signal conditioning device and thermoacoustic sound projector. The thermoacoustic sound projector includes a planar nanotube structure. The planar nanotube structure includes one or more nanotube films selected from the group consisting of single-walled carbon nanotube films, few-walled carbon nanotube films, multi-walled carbon nanotube films, boron nitride nanotube films, and combinations thereof. The thermoacoustic sound projector further includes at least two electrodes. The planar nanotube structure is suspended between two of these electrodes. The thermoacoustic sound projector further includes an encapsulated housing (also known as an encapsulated enclosure) that encloses the planar nanotube film structure. The encapsulated housing includes two relatively flat plates, with at least one plate being capable of vibrating. The thermoacoustic sound projector further includes a gas medium that is contained within the encapsulated housing.

Implementations of the invention can include one or more of the following features:

The planar nanotube structure can be a planar carbon nanotube structure (i.e., the planar nanotube structure includes one or more nanotube films selected from the group consisting of single-walled carbon nanotube films, few-walled carbon nanotube films, multi-walled carbon nanotube films, and combinations thereof).

The two vibrating plates can be symmetric or asymmetric. One plate can be so rigid to be essentially non-vibrating.

In general, in another aspect, the invention features a thermoacoustic apparatus that includes a signal conditioning device and thermoacoustic sound projector. The thermoacoustic sound projector includes a planar nanotube structure. The planar nanotube structure includes one or more nanotube films selected from the group consisting of single-walled carbon nanotube films, few-walled carbon nanotube films, multi-walled carbon nanotube films, boron nitride nanotube films, and combinations thereof. The thermoacoustic sound projector further includes at least two electrodes. The planar nanotube structure is suspended between two of these electrodes. The thermoacoustic sound projector further includes an encapsulated housing (also known as an encapsulated enclosure) that encloses the planar carbon nanotubes structure. The encapsulated housing includes two relatively flat plates, with at least one plate being capable of vibrating. The thermoacoustic sound projector further includes a gas medium that is contained within the encapsulated housing. The one or more nanotube films of the thermoacoustic sound projector include a thin homogeneous carbon nanotube structure, a boron nitride nanotube film structure, and combinations thereof. The nanotube structure can be a number of superimposed nanotube layers.

Implementations of the invention can include one or more of the following features:

The thin homogeneous carbon nanotube structure can have high electrical conductivity.

The number of superimposed carbon nanotube layers can be operable to increase the carbon nanotube-gas medium interaction and overall sound generation pressure.

The number of superimposed carbon nanotube layers can be much greater than five when high sound generation efficiency is not needed.

The number of superimposed carbon nanotube layers can be less than five when high efficiency of sound generation is needed.

In general, in another aspect, the invention features a thermoacoustic apparatus that includes a signal conditioning device and thermoacoustic sound projector. The thermoacoustic sound projector includes a planar nanotube structure. The planar nanotube structure includes one or more nanotube films selected from the group consisting of single-walled carbon nanotube films, few-walled carbon nanotube films, multi-walled carbon nanotube films, boron nitride nanotube films, and combinations thereof. The thermoacoustic sound projector further includes at least two electrodes. The planar nanotube structure is suspended between two of these electrodes. The thermoacoustic sound projector further includes an encapsulated housing (also known as an encapsulated enclosure) that encloses the planar nanotube structure. The encapsulated housing includes two relatively flat plates, with at least one plate being capable of vibrating. The thermoacoustic sound projector further includes a gas medium that is contained within the encapsulated housing. In some embodiments, the planar nanotube structure has a positive coefficient of resistivity.

Implementations of the invention can include one or more of the following features:

The planar nanotube structure can have a positive coefficient of resistivity such to avoid the current redistribution in the planar nanotube structure to large bundles of nanotubes having lower sound generation efficiency.

In general, in another aspect, the invention features a thermoacoustic apparatus that includes a signal conditioning device and thermoacoustic sound projector. The thermoacoustic sound projector includes a planar nanotube structure. The planar nanotube structure includes one or more nanotube films selected from the group consisting of single-walled carbon nanotube films, few-walled carbon nanotube films, multi-walled carbon nanotube films, boron nitride nanotube films, and combinations thereof. The thermoacoustic sound projector further includes at least two electrodes. The planar nanotube structure is suspended between two of these two electrodes. The thermoacoustic sound projector further includes an encapsulated housing (also known as an encapsulated enclosure) that encloses the planar carbon nanotubes structure. The encapsulated housing includes two relatively flat plates, with at least one plate being capable of vibrating. The thermoacoustic sound projector further includes a gas medium that is contained within the encapsulated housing. The thermoacoustic sound projector includes a framing element with two opposite conductive electrodes parallel to each other. The thermoacoustic sound projector includes aligned nanotube sheets attached to the frame in orthogonal directions.

Implementations of the invention can include one or more of the following features:

The orthogonal direction of the nanotube sheets (corresponding to a 90° bias angle) can be operable to avoid mechanical vibrations on the edges of nanotube sheets and for large bundles of nanotubes, which can be caused by static potential and Lorentz forces. The aligned nanotube sheets can optionally be aligned in a plurality of directions, such as with bias angle of 60° or −60° between neighboring sheets.

In general, in another aspect, the invention features a thermoacoustic apparatus that includes a signal conditioning device and thermoacoustic sound projector. The thermoacoustic sound projector includes a planar nanotube structure. The planar nanotube structure includes one or more nanotube films selected from the group consisting of single-walled carbon nanotube films, few-walled carbon nanotube films, multi-walled carbon nanotube films, boron nitride nanotube films, and combinations thereof. The thermoacoustic sound projector further includes at least two electrodes. The planar nanotube structure is suspended between two of these electrodes. The thermoacoustic sound projector further includes an encapsulated housing (also known as an encapsulated enclosure) that encloses the planar nanotube structure. The encapsulated housing includes two relatively flat plates, with at least one plate capable of vibrating. The thermoacoustic sound projector further includes a gas medium that is contained within the encapsulated housing. The planar nanotubes structure and vibrating plates (in their flat states) are separated by a spacing that is larger than the thermal diffusion length of the filled gas medium for a predetermined sound frequency range of the thermoacoustic apparatus. The spacing between the planar carbon nanotubes structure and vibrating plates is small enough to provide high conversion efficiency (which is proportional to the reciprocal to the enclosure volume (1/V), but large enough in the free-standing sheet regime that the TA sheets do not make contact with the vibrating plates.

Implementations of the invention can include one or more of the following features:

The distance between the planar nanotube structure and the vibrating plates can be as close as possible without touching.

The spacing can be greater than 50 µm.

The gas medium can be an inert gas that provides temperature modulation on the surface of the planar carbon nanotubes structure to at least 2000 K.

The gas medium can be nitrogen, argon, xenon, or a combination thereof.

The spacing can have a minimum distance operable to avoid heat dissipation through contact between the planar carbon nanotubes structure and the vibrating plate or plates of the encapsulated housing.

In general, in another aspect, the invention features a thermoacoustic apparatus that includes a signal conditioning device and thermoacoustic sound projector. The thermoacoustic sound projector includes a planar nanotube structure. The planar nanotube structure includes one or more nanotube films selected from the group consisting of single-walled carbon nanotube films, few-walled carbon nanotube films, multi-walled carbon nanotube films, boron nitride nanotube films, and combinations thereof. The thermoacoustic sound projector further includes at least two electrodes. The planar nanotube structure is suspended between two of these electrodes. The thermoacoustic sound projector further includes an encapsulated housing (also known as an encapsulated enclosure) that encloses the planar nanotubes structure. The encapsulated housing includes two relatively flat plates, with at least one plate being capable of vibrating. The thermoacoustic sound projector further includes a gas medium that is contained within the encapsulated housing. The thermoacoustic sound projector further includes adhesive elastic ribbon that has sealed the encapsulated housing circumferentially. The adhesive elastic ribbon has a thickness that is larger than the vibrating amplitude of the vibrating plates.

Implementations of the invention can include one or more of the following features:

The electrodes can be copper, titanium foil, or a combination thereof.

The adhesive elastic ribbon can be a silicone rubber ribbon or a polyurethane ribbon.

The vibrating amplitude can be larger than 50 µm (for 130 dB per meter).

In general, in another aspect, the invention features a thermoacoustic apparatus that includes a signal conditioning device and thermoacoustic sound projector. The thermoacoustic sound projector includes a planar nanotube structure. The planar nanotube structure includes one or more nanotube films selected from the group consisting of single-walled carbon nanotube films, few-walled carbon nanotube films, multi-walled carbon nanotube films, boron nitride nanotube films, and combinations thereof. The thermoacoustic sound projector further includes at least two electrodes. The planar nanotube structure is suspended between two of these electrodes. The thermoacoustic sound projector further includes an encapsulated housing (also known as an encapsulated enclosure) that encloses the planar nanotubes structure. The encapsulated housing includes two relatively flat plates, with at least one plate being capable of vibrating. The thermoacoustic sound projector further includes a gas medium that is contained within the encapsulated housing. The one or both plates include a material that can reflect the infrared radiation emitted by hot nanotubes or a material that includes dielectric ceramic plates that are coated with an infrared radiation reflective metallic film.

Implementations of the invention can include one or more of the following features:

The coating of the infrared radiation reflective metallic film can be a thin film.

The thin film can be thick enough to reflect infrared radiation.

The thin film can be at least 200 nm thick.

The infrared radiation reflective metallic film can include a film of Ni, Al, Cu, or a combination thereof.

In general, in another aspect, the invention features a thermoacoustic apparatus that includes a signal conditioning device and thermoacoustic sound projector. The thermoacoustic sound projector includes a planar nanotube structure. The planar nanotube structure includes one or more nanotube films selected from the group consisting of single-walled carbon nanotube films, few-walled carbon nanotube films, multi-walled carbon nanotube films, boron nitride nanotube films, and combinations thereof. The thermoacoustic sound projector further includes at least two electrodes. The planar nanotube structure is suspended between two of these electrodes. The thermoacoustic sound projector further includes an encapsulated housing (also known as an encapsulated enclosure) that encloses the planar nanotube structure. The encapsulated housing includes two relatively flat plates, with at least one plate being capable of vibrating. The thermoacoustic sound projector further includes a gas medium that is contained within the encapsulated housing.

The inner sides of the vibrating plates are coated with small oxide particles operable for preventing the sticking of the planar nanotube structure to the vibrating plate while being bended, pushed, or twisted.

Implementations of the invention can include one or more of the following features:

The small oxide particles can be smaller than the spacing between the planar nanotube structure and the vibrating plates.

The oxide particles can have a diameter between 2 μm and 20 μm.

The oxide particles can be made of $SiO_2$, $TiO_2$, $Al_2O_3$ or a combination thereof.

The oxide particles can have shapes in the form of spheres, rods, platelets, and combinations thereof.

In general, in another aspect, the invention features a thermoacoustic apparatus that includes a signal conditioning device and thermoacoustic sound projector. The thermoacoustic sound projector includes a planar nanotube structure. The planar nanotube structure includes one or more nanotube films selected from the group consisting of single-walled carbon nanotube films, few-walled carbon nanotube films, multi-walled carbon nanotube films, boron nitride nanotube films, and combinations thereof. The thermoacoustic sound projector further includes at least two electrodes. The planar nanotube structure is suspended between two of these electrodes. The thermoacoustic sound projector further includes an encapsulated housing (also known as an encapsulated enclosure) that encloses the planar nanotube structure. The encapsulated housing includes two relatively flat plates, with at least one plate being capable of vibrating. The thermoacoustic sound projector further includes a gas medium that is contained within the encapsulated housing. The sealed enclosure includes two rigid flat plates that can withstand temperatures of at least 1000° C. and that have a Young modulus and density chosen to provide a desired frequency $f_r$ and high resonance quality factor, Q.

Implementations of the invention can include one or more of the following features:

The encapsulated thermoacoustic sound projector can be operable for generating Q times higher sound pressure level at the resonance frequency than the same planar nanotube structure in an open housing.

The two rigid flat plates (the vibrating plates) can be made of metal (high density material), ceramic (middle density material), glass or polymer (low density material) or a combination thereof.

In general, in another aspect, the invention features a thermoacoustic apparatus that includes a signal conditioning device and thermoacoustic sound projector. The thermoacoustic sound projector includes a planar nanotube structure. The planar nanotube structure includes one or more nanotube films selected from the group consisting of single-walled carbon nanotube films, few-walled carbon nanotube films, multi-walled carbon nanotube films, boron nitride nanotube films, and combinations thereof. The thermoacoustic sound projector further includes at least two electrodes. The planar nanotube structure is suspended between two of these electrodes. The thermoacoustic sound projector further includes an encapsulated housing (also known as an encapsulated enclosure) that encloses the planar nanotube structure. The encapsulated housing includes two relatively flat plates, with at least one plate capable of vibrating. The thermoacoustic sound projector further includes a gas medium that is contained within the encapsulated housing. The gas medium has a high heat capacity ratio ($\gamma=C_p/C_v$) of at least 1.5 and a heat capacity ($C_p$) of no more than about 200 J/(kg K).

Implementations of the invention can include one or more of the following features:

The heat capacity ratio can be at least 1.5.

The heat capacity can be at most 200 J/(kg K).

The gas medium can be xenon.

The gas medium can provide five times higher sound pressure level than air.

In general, in another aspect, the invention features a thermoacoustic apparatus that includes a signal conditioning device and thermoacoustic sound projector. The thermoacoustic sound projector includes a planar nanotube structure. The planar nanotube structure includes one or more nanotube films selected from the group consisting of single-walled carbon nanotube films, few-walled carbon nanotube films, multi-walled carbon nanotube films, boron nitride nanotube films, and combinations thereof. The thermoacoustic sound projector further includes at least two electrodes. The planar nanotube structure is suspended between two of these electrodes. The thermoacoustic sound projector further includes an encapsulated housing (also known as an encapsulated enclosure) that encloses the planar nanotubes structure. The encapsulated housing includes two relatively flat plates, with at least one plate being capable of vibrating. The thermoacoustic sound projector further includes a gas medium that is contained within the encapsulated housing. The electrical connection between the planar nanotube structure and conductive electrodes is by direct attachment of the planar nanotube structure to the surface of the electrodes with subsequent densification of the portion of the planar nanotube structure that overlaps the electrodes.

Implementations of the invention can include one or more of the following features:

The densified portion of the planar nanotube structure can be formed by using volatile liquids for wetting and drying the portion of the planar nanotube structure.

The volatile liquids can include methanol, ethanol, acetone, liquid nitrogen, and combinations thereof.

In general, in another aspect, the invention features a thermoacoustic apparatus that includes a signal conditioning device and thermoacoustic sound projector. The thermoacoustic sound projector includes a planar nanotube structure. The planar nanotube structure includes one or more nanotube films selected from the group consisting of single-walled carbon nanotube films, few-walled carbon nanotube films, multi-walled carbon nanotube films, boron nitride nanotube films, and combinations thereof. The thermoacoustic sound projector further includes at least two electrodes. The planar nanotube structure is suspended between two of these electrodes. The thermoacoustic sound projector further includes an encapsulated housing (also known as an encapsulated enclosure) that encloses the planar nanotubes structure. The encapsulated housing includes two relatively flat plates, with at least one plate being capable of vibrating. The thermoacoustic sound projector further includes a gas medium that is contained within the encapsulated housing. The thermoacoustic apparatus further includes a modulator and a dynamic carrier control (DCC) circuit for dynamically controlling the power supplied to the projector based on parameters of the input signal. When the carrier signal includes a low range of parameters, the DCC circuit is operable for reducing the power to the modulator in proportion to the amount of modulation required to modulate the range of parameters to produce the desired sound signal.

When there is no sound signal, the power supplied to the modulator is operable for turning off until the recognition of another sound signal.

In general, in another aspect, the invention features a thermoacoustic apparatus that includes a signal conditioning device and thermoacoustic sound projector. The thermoacoustic sound projector includes a planar nanotube structure. The planar nanotube structure includes one or more nanotube films selected from the group consisting of single-walled carbon nanotube films, few-walled carbon nanotube films, multi-walled carbon nanotube films, boron nitride nanotube films, and combinations thereof. The thermoacoustic sound projector further includes at least two electrodes. The planar nanotube structure is suspended between two of these electrodes. The thermoacoustic sound projector further includes an encapsulated housing (also known as an encapsulated enclosure) that encloses the planar nanotube structure. The encapsulated housing includes two relatively flat plates, with at least one plate being capable of vibrating. The thermoacoustic sound projector further includes a gas medium that is contained within the encapsulated housing. The thermoacoustic apparatus further includes a modulator and a dynamic carrier control (DCC) circuit for dynamically controlling the power supplied to the modulator based on parameters of the input carrier signal. The power supplied to the modulator is in direct proportion to a range of parameters in order to produce or maintain the desired sound signal.

Implementations of the invention can include one or more of the following features:

The parameters can include one or more of frequency, phase and amplitude.

The parameters of the carrier signal can be analyzed respective of a baseband.

The parameters of the carrier signal can be analyzed respective of a passband.

The DCC circuit can be operable for analyzing the current associated with the input acoustic signal and can adjust the carrier signal modulator in a proportion required to produce the desired sound signal. The input acoustic signal dictates the parameters of the carrier signal that is input to the thermo-acoustic projector.

In general, in another aspect, the invention features a thermoacoustic apparatus that includes a signal conditioning device and thermoacoustic sound projector. The thermoacoustic sound projector includes a planar nanotube structure. The planar nanotube structure includes one or more nanotube films selected from the group consisting of single-walled carbon nanotube films, few-walled carbon nanotube films, multi-walled carbon nanotube films, boron nitride nanotube films, and combinations thereof. The thermoacoustic sound projector further includes at least two electrodes. The planar nanotube structure is suspended between two of these electrodes. The thermoacoustic sound projector further includes an encapsulated housing (also known as an encapsulated enclosure) that encloses the planar nanotubes structure. The encapsulated housing includes two relatively flat plates, with at least one plate being capable of vibrating. The thermoacoustic sound projector further includes a gas medium that is contained within the encapsulated housing. The signal conditioning device is operable for powering the thermoacoustic sound projector. The input power that drives the thermoacoustic modulator is a high frequency carrier signal whose amplitude is modulated by the input audio sound signal to provide the desired output sound from the thermoacoustic projector.

Implementations of the invention can include one or more of the following features:

The signal conditioning device (a dynamic carrier control, DCC) can be operable to reduce energy consumption by providing a carrier wave, having a frequency that is high compared with that of the audio frequencies that are sought from the thermo-acoustic sound projector, wherein the signal conditioning device varies the amplitude of the carrier wave current in response to an input audio signal so that the output of the signal conditioning device heats the TA projector film in a manner to result is projected sound that replicates the input acoustic signal.

The signal conditioning can operate to provide 100% modulation of the carrier wave current and to provide no carrier current when the audio input signal is negligible small.

The frequency of the carrier signal can be at least one order of magnitude higher than the frequencies of the sound spectrum of the thermoacoustic apparatus.

The frequency of the carrier signal can be at least one order of magnitude higher than the resonance frequency of the vibrating plates, $f_r$.

The frequency of the carrier signal can be selected from the region of the highest sound pressure level of the sound generated by an open housing.

The frequency of carrier signal can be about 50 kHz.

The input power can be generated from a conditioning device.

The generating device can be an internal generator.

In general, in another aspect, the invention features a thermoacoustic apparatus that is a combination of two or more of the embodiments above or a thermoacoustic apparatus of one or more of the above having features from other embodiments.

In general, in another aspect, the invention features the thermoacoustic sound projector portion of the embodiments of the above thermoacoustic apparatus.

In general, in another aspect, invention features a method of operating one or more of the thermoacoustic apparatuses (and/or thermoacoustic sound projector portions) of the above embodiments.

In general, in another aspect, invention features a manufacturing one or more of the thermoacoustic apparatuses (and/or thermoacoustic sound projector portions) of the above embodiments.

BRIEF DESCRIPTION OF THE DRAWINGS

For better understanding of the present invention, and the advantages thereof, reference is now made to the following descriptions taken in conjunction with the accompanying drawings. The components in the drawings are not necessarily to scale, the emphasis instead being placed upon clearly illustrating the principles of the present encapsulated TA device and method for generating sound waves.

(FIG. 6A) with pure alternative current; (FIG. 6B) with alternating and direct current superimposed; (FIG. 6C) with a high frequency carrier current modulated at the frequency of the desired sound. In each of FIGS. 6A-6C, the current (left axis), temperature change and sound output (right axis), and time (horizontal axis) are normalized. The applied sinusoidal current (lines 601) creates the temperature variation around the heater (lines 602). The induced gas expansion results in sound waves: at twice the input current frequency in the method shown in FIG. 6A; without frequency doubling (but with high distortion and low efficiency) in the method shown in FIG. 6B; and without distortion and with high conversion efficiency for the sound waves (603) in the method shown in FIG. 6C.

FIG. 14A is a schematic illustration of a thermoelectric module that is incorporated as part of thermoacoustic projector.

FIG. 14B is a graph showing the ac signal with dc biasing (horizontal line 1404) as a function of time on the x-axis.

DETAILED DESCRIPTION

Figure 1A:
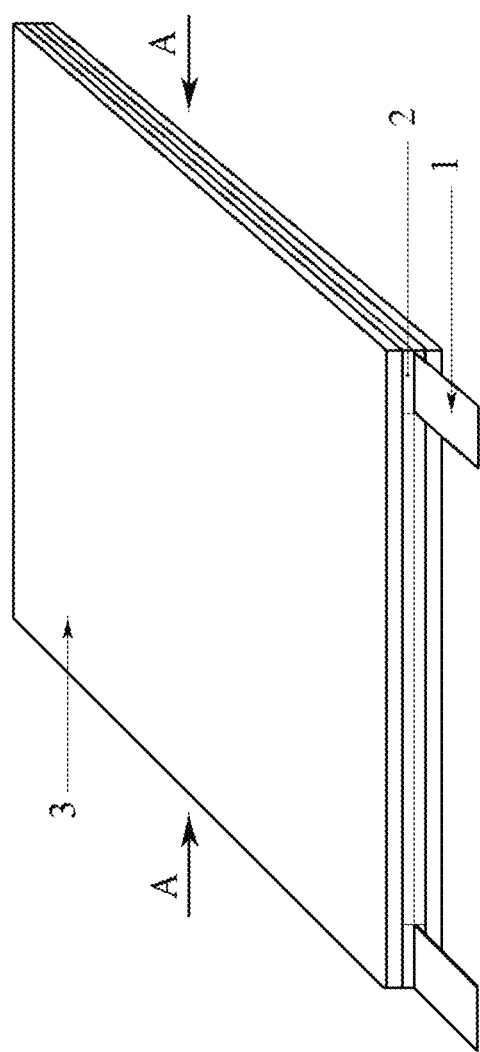
FIG. 1A depicts a schematic structural view of a flat encapsulated TA device in accordance with an embodiment of the present invention.
Figure 1B:
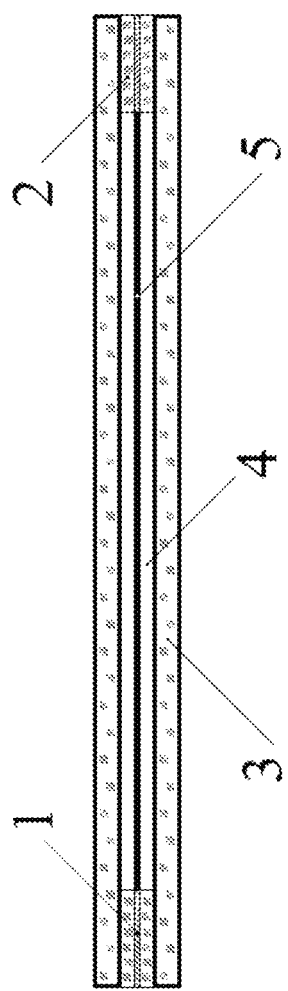
FIG. 1B depicts a side view of the flat encapsulated TA device shown in FIG. 1A taken from viewpoint "A."

The present invention is directed to the enhancement of the efficiency of TA sound projector and to protect the nanoscale heater from the harsh environment. The encapsulation of free-standing carbon nanotube (CNT) film in inert gases between two flat membranes (or rigid plates), affords both device protection and the enhancement of low frequency sound generation. The typical structure of an encapsulated TA device according to an embodiment, which is depicted in FIGS. 1A-1B, has two conductive electrodes 1 attached to opposite edges of vibrating plate 3 through the elastic silicon rubber 2. The thin CNT sheet 5 (or plurality of CNT sheets superimposed to each other) suspended between two plates 3 is connected to electrodes 1. The interior of thereby assembled encapsulated device is filled with inert gas 4, preferably with low heat capacity, G.

Figure 2:
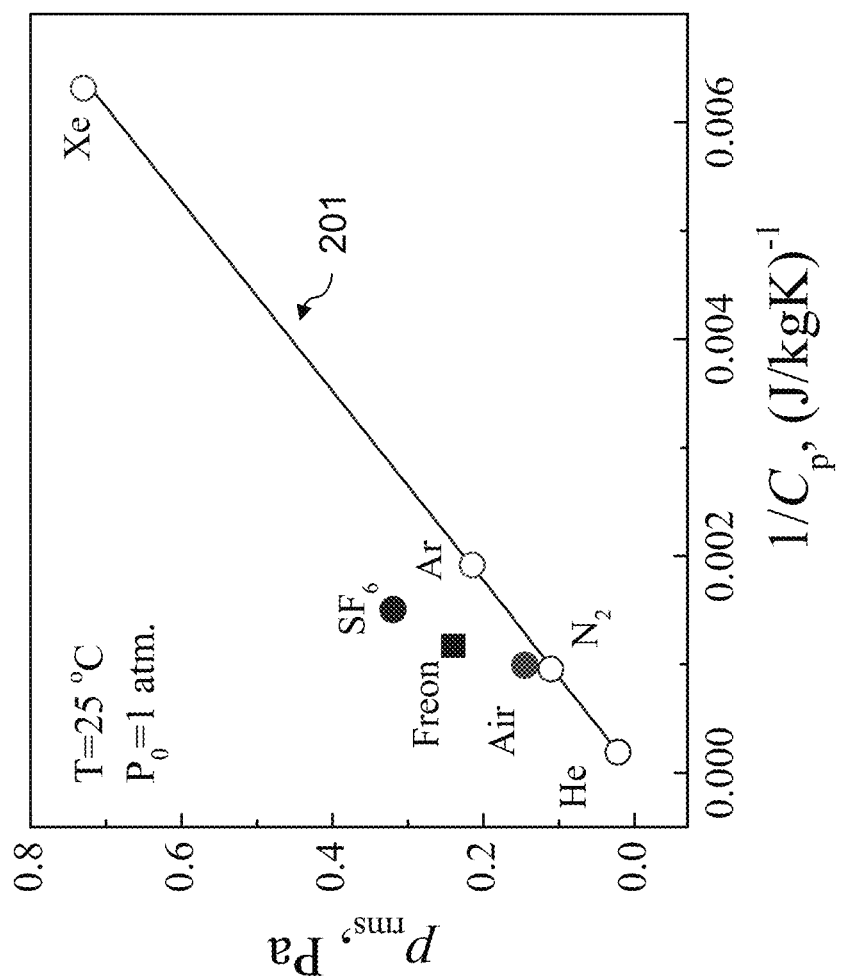
FIG. 2 is a graph that shows the sound pressure generated by single MWNT sheet versus reciprocal heat capacity, $1/C_p$ measured in anechoic chamber at 1 atm. pressure and T=25° C. for seven gases: He, $N_2$, Air, Ar, Freon (R143A), Xe and $SF_6$. Line 201 is a theoretical line plotted for inert gases using thermodynamic approach.

Since the TA loudspeaker acts as a heat engine, the maximum energy conversion efficiency, according to Carrot's theorem, cannot exceed $\eta=1-T_c/T_h$, where $T_c$ is the absolute temperature of the cold reservoir, and $T_h$ is the absolute temperature of the hot reservoir, i.e., the temperature modulation amplitude. The CNT film exposed to air starts to burn at $T_h \leq 600°$ C., while in inert gases the temperature of CNT can reach 2000 K. Since the efficiency of a TA device linearly increases with the increase of applied power, i.e., increase of temperature modulation amplitude, this enables a higher efficiency for TA devices filled with inert gases. The experimental data for sound pressure measured in four inert gases He, N$_2$, Ar and Xe using boundary conditions of open system shown in FIG. 2 versus $1/C_p$ is in good agreement with the theoretical prediction. The TA sound pressure generated in xenon gas is >5 times higher than in air.

Figure 3:
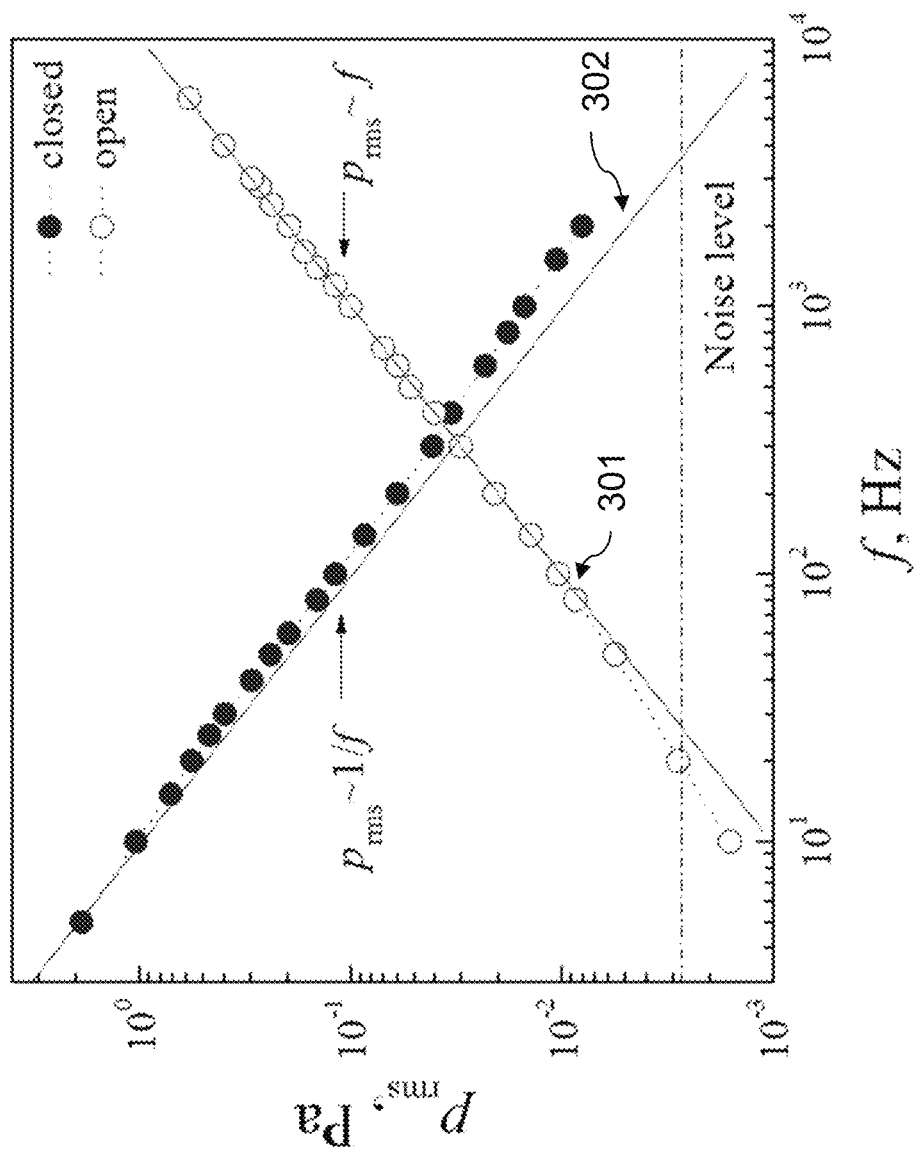
FIG. 3 is a graph that compares the frequency dependence of sound pressure generated by a single MWNT sheet (5×5 cm$^2$) at increased frequency for open and closed systems (lines 301 and 302, respectively).

Despite the attractive wide frequency sound generation spectra of the open TA system for audio applications, the energy conversion efficiency is extremely low at low frequencies. Unlike an open device, the encapsulated device has higher efficiency at low frequencies. FIG. 3 shows the sound pressure generated by single layer MWNT sheet as a function of frequency for open and closed systems (lines 301 and 302, respectively). The three order higher pressure variation in the low-frequency limit comparing to the open system explicitly indicates the advantage of encapsulated TA devices for operation in the low frequency domain.

In a small enclosure, where the distance between the thermal source and walls is much smaller than the acoustic wave length λ and larger than the thermal diffusion length, the sound pressure (SP) produced by a TA projector is directly related to the ideal gas law: $P_0=(nR/V)T$, where the number of moles of gas (n) and the volume (V) in the closed hermetic chamber are held constant (R is the ideal gas constant). This thermal diffusion length is $l=(\alpha/\pi f)^{1/2}$, where α is the thermal diffusivity of the gas and f is the sound frequency in the gas (for example, l~0.12 mm for f=1 kHz in air). Because of the ideal gas law, in such a closed system with rigid walls the generated dynamic pressure $p_{rms}$ is reciprocal to the volume of the enclosure, V.

Figure 4:
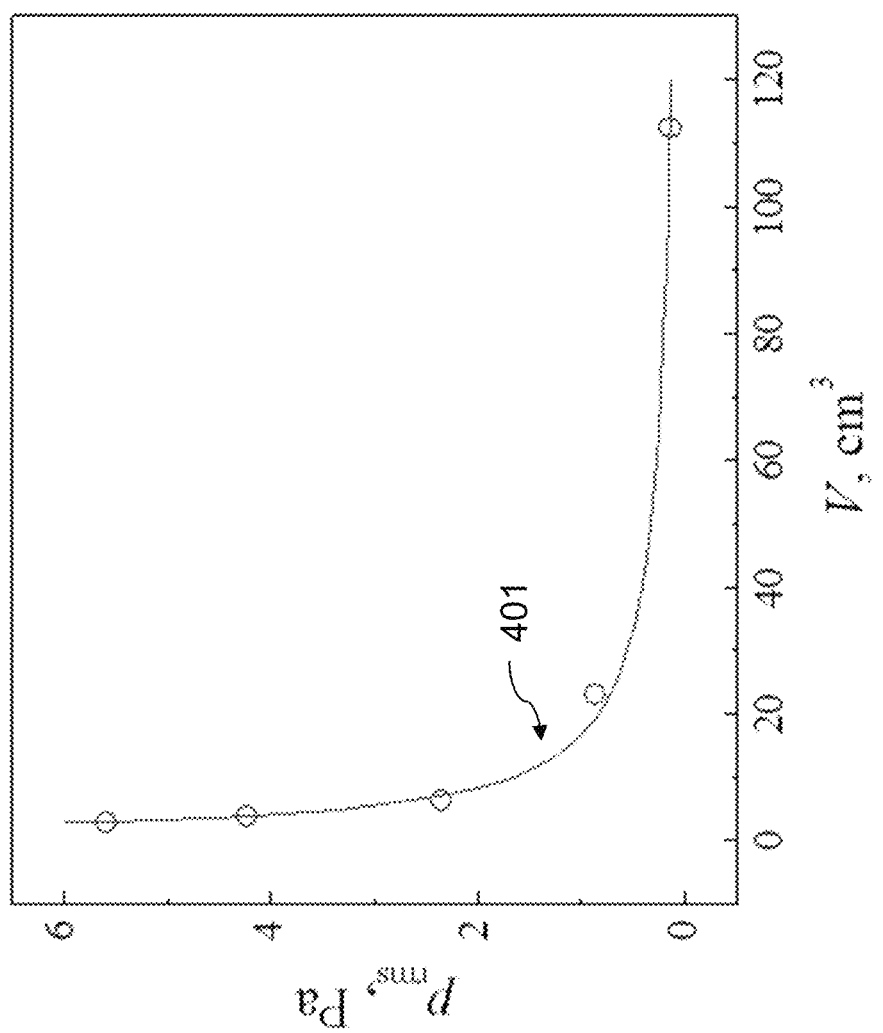
FIG. 4 is a graph that shows the dependence of sound pressure (normalized to the applied power) on encapsulated volume (V). Line 401 shows calculated 1/V dependence of sound pressure.

FIG. 4 shows the volume dependence of sound pressure generated at a resonance frequency ($f_r \approx 2.4$ kHz) for five encapsulated flat plate sound projectors filled with argon with fixed size of the plates (75×50×1 mm$^3$, Corning glass microscope slides) and varying spacing between the plates: 2 g=0.8; 0.11; 1.74; 6.24; and 30 mm. The power normalized SP for all five samples were measured in the near field at fixed distance, r=2.5 cm. The obtained result confirms the validity of theoretical prediction and reflects to use as small as possible spacing between the plates.

Figure 5:
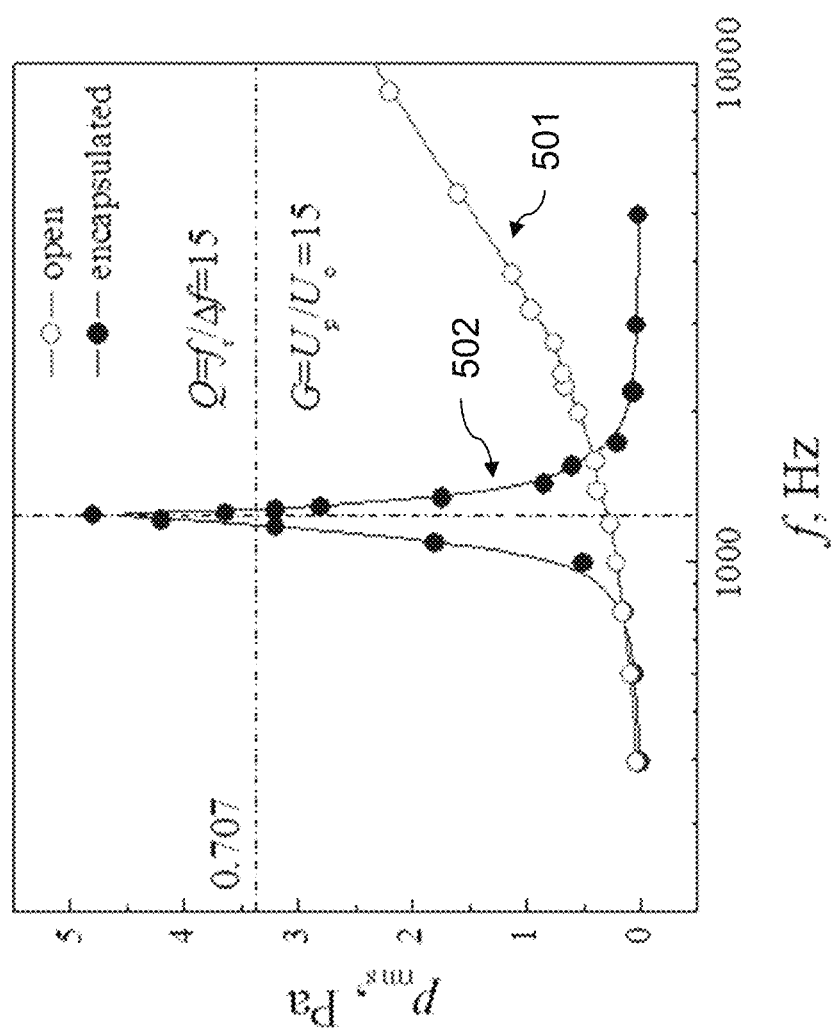
FIG. 5 is a graph that shows the comparison of sound pressure generated by open MWNT sheet (line 501) and the same sheet sealed in argon gas between two fused quartz glass encapsulating plates (line 501).

While the open TA system provides smooth spectra with sound pressure proportional to the frequency, the encapsulated device with stiff flat plates is resonant. For the flat encapsulated TA projector, the pressure modulation generated in a closed system now is an internal driven force for the vibrating plates. At frequency of modulated temperature close to the mechanical resonance of the plates the output sound pressure produced by vibrating plate p(r), driven by internal force source $p_{rms}$ is Q time larger, where $Q=f_r/\Delta f$ is the resonant quality factor of vibrating plate. Hence, the sound pressure generated by encapsulated TA projector adopts all features of closed system pressure superimposed on the resonant feature of vibrating plates. The overall enhancement of generated SP for TA projector shown in FIG. 5 is $G=p_{encaps.}/p_{open} \approx 15$, which is consistent with the resonant quality factor, $Q=f_r/\Delta f=17.8$. Here $\Delta f$ is the width of the resonance peak at the pressure level of $1/\sqrt{2}$.

To generate sound directly on the first harmonic of applied ac power ($f_r$) without dc biasing, it is believed the frequency of the sinusoidal carrier current in an encapsulated device should be kept close to the maximum of the spectra of the non-enclosed CNT film ($f_c \approx 50$-60 kHz) and the carrier current should be modulated by the resonant envelope at $f_r$. The elastically clamped plates will respond only to the low frequency current envelope with peak amplitude at $f_r$, while the high frequency temperature modulation will create the pressure background with the efficiency of a non-biased system.

Figure 6A:
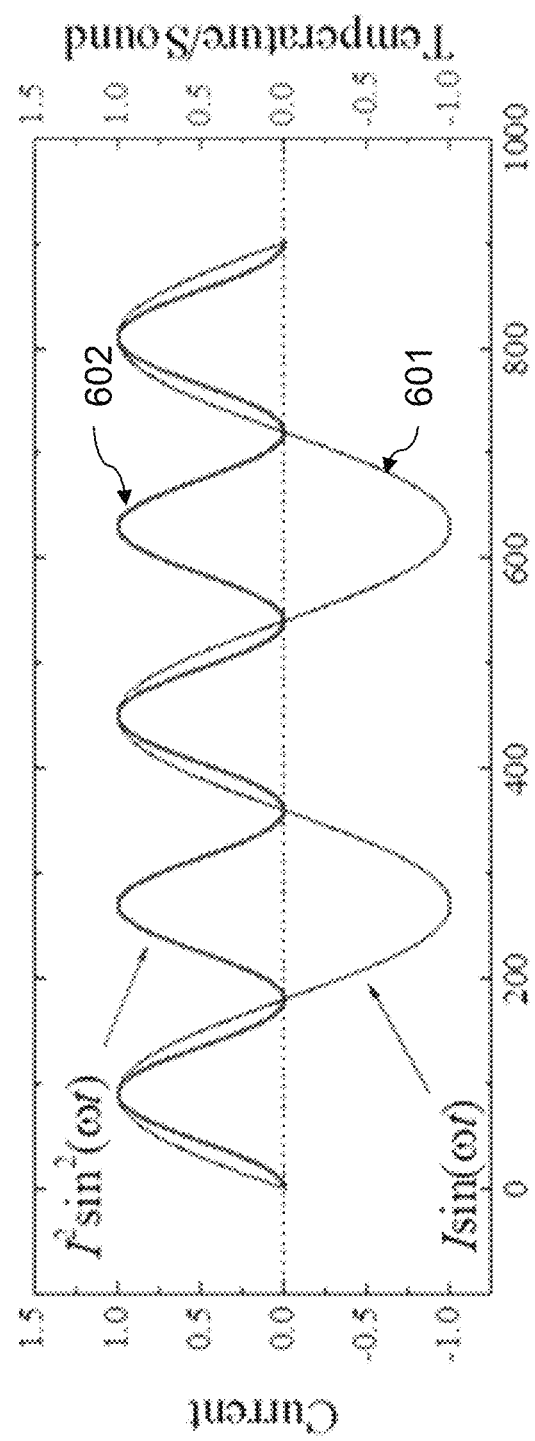
FIGS. 6A-6C are schematic diagrams illustrating the consequences of applying three different methods for supplying the TA heater (which is a nanotube sheet) with electrical current.
Figure 6B:
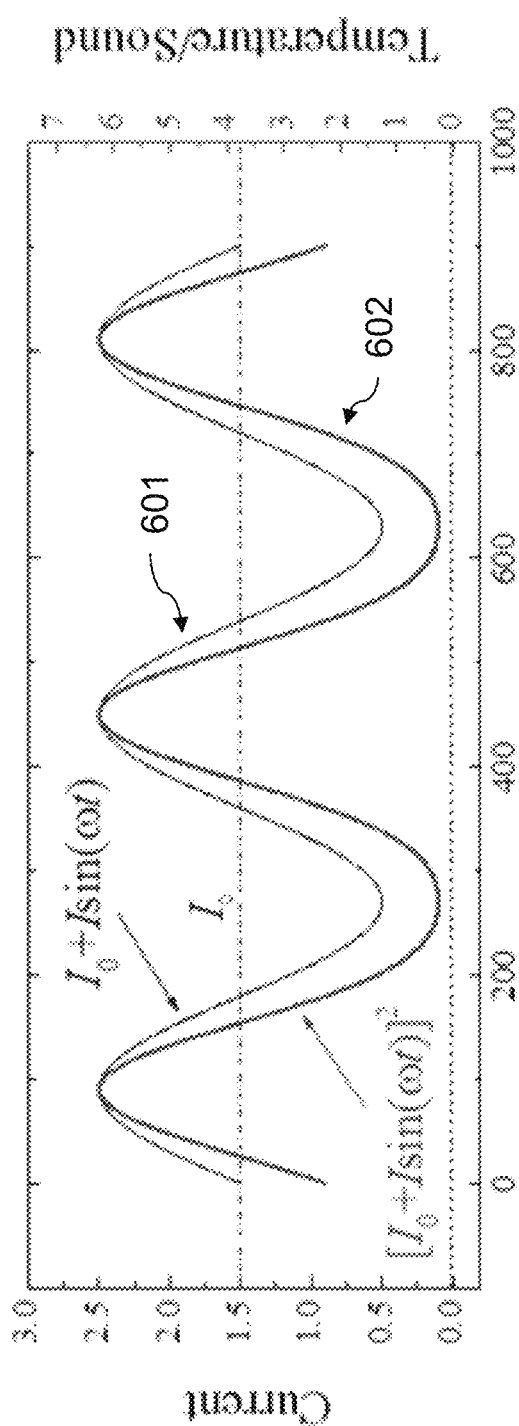
Figure 6C:
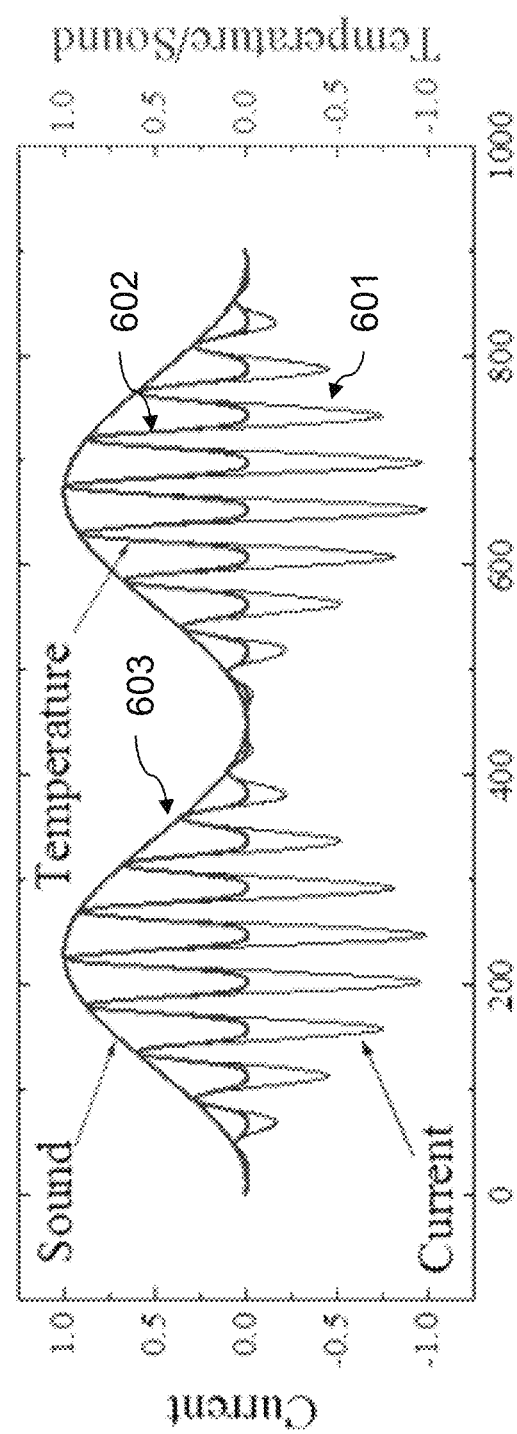

FIGS. 6A-6C show the current-temperature-sound conversion for three type of power supply. The important advantage of the third method (shown in FIG. 6C) is that sound is generated on the first harmonic of the applied voltage. Second, it requires $\sqrt{2}$ lower averaged applied current, which gives a two-fold enhancement benefit for acoustic power generation and efficiency. Note also that the use of non-sinusoidal carrier signal modulation, or pulse-width modulation, introduces large distortions.

Figure 7A:
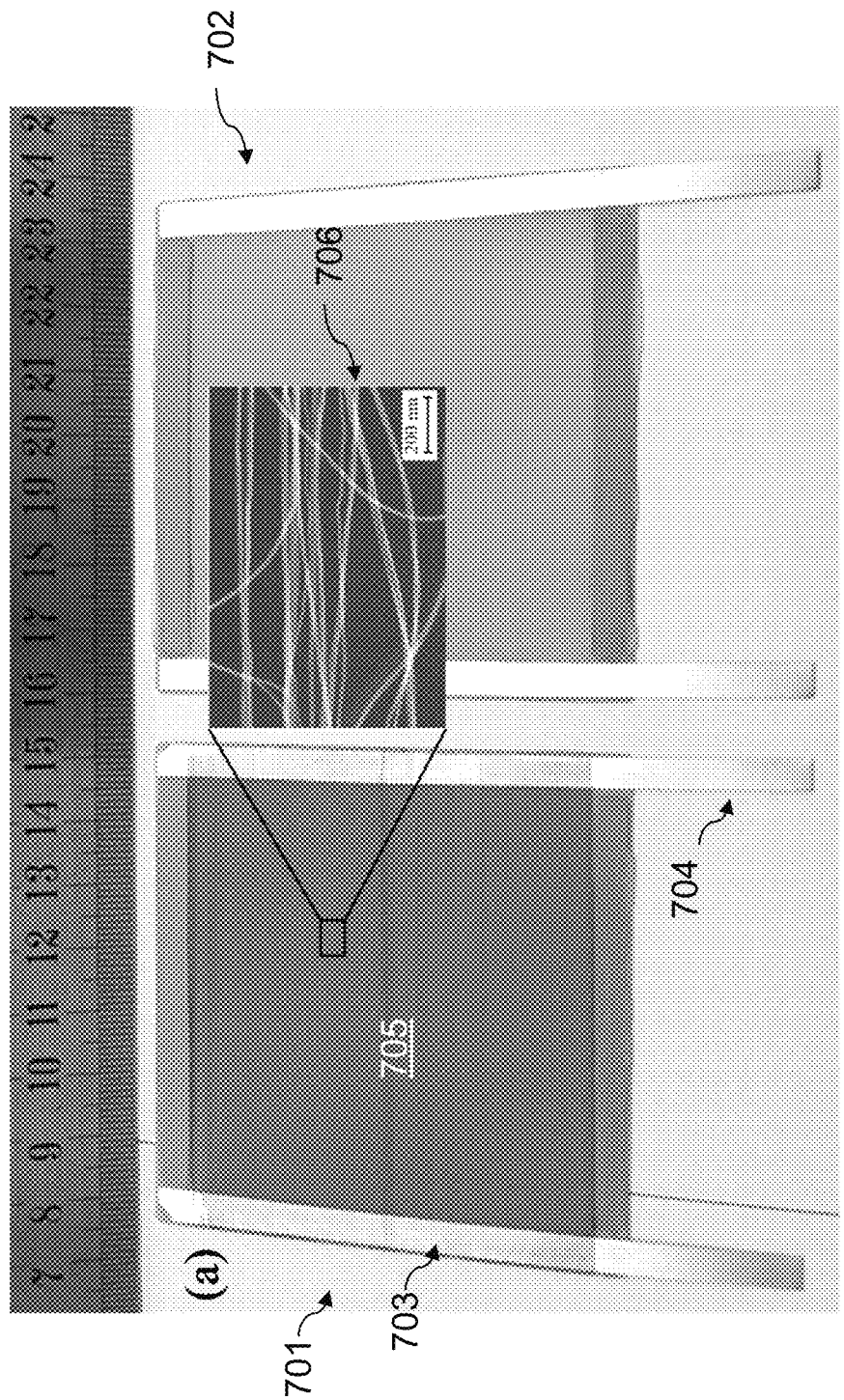
FIG. 7A is a side-by-side view of two 7.5×7.5 cm$^3$ AlN ceramic plates (701 and 702) with attached copper electrodes (strips 703 and 704) before assembly. One layer of suspended carbon multi-walled nanotube (MWNT) sheet 705 is attached to the left panel. A scanning electron microscope (SEM) image of a single layer MWNT sheet is shown in 706.
Figure 7B:
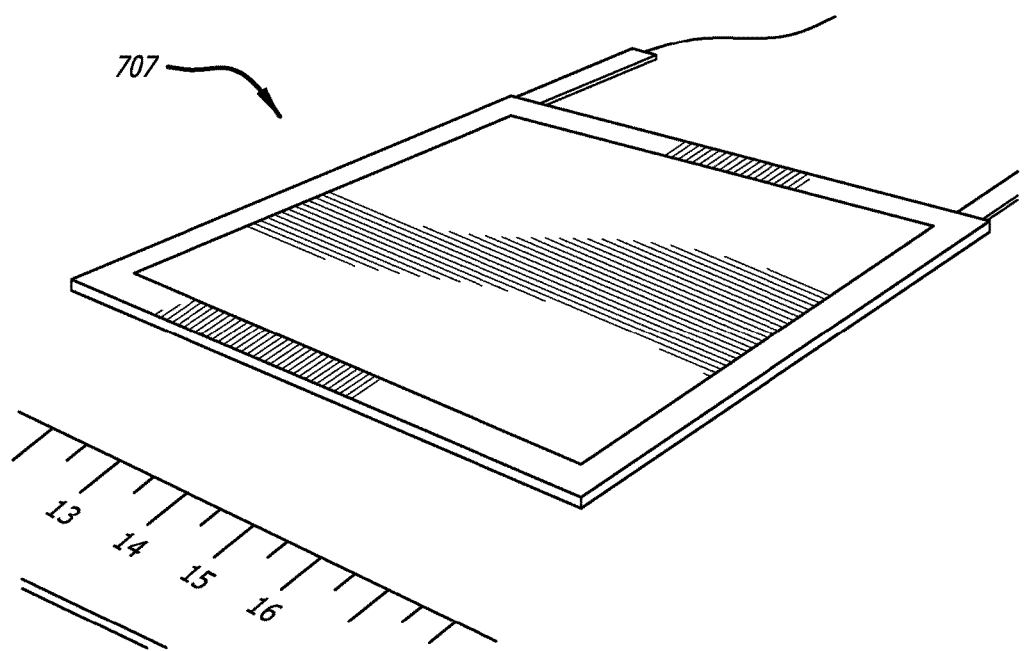
FIG. 7B is a 1 mm thick, argon-filled sound projector assembly 707 using AlN ceramic plates.

In the embodiment shown in FIGS. 7A-7B, the TA projector includes two (7.5×7.5 cm$^2$) aluminum nitrate (AlN) ceramic plates with the thickness selected for desired resonance frequency of the sound projector. The 5 mm wide and 0.15 mm thick strips of one-side printing circuit board (PCB strips 703 and 704) were attached to the two parallel edges of both plates using silicon paste (Multi-Purpose sealant 732, Dow Corning Corp.). To create a sealed cavity, two other orthogonal edges were also covered with the same strips attached facedown. The free-standing multiwall carbon nanotube (MWNT) sheet 705 withdrawn from the CVD grown forest was attached to the assembly between two copper electrodes as shown on the left plate in FIG. 7A.

To improve the MWNT/copper electrical connection, the MWNT sheet contacting the surface of copper foil was densified using methanol wetting and following drying (or the corresponding use for densification of other wetting liquids, like ethanol, acetone, acetonitrile, etc.). Two ceramic plates with attached electrodes and free-standing MWTN sheet (or multiple sheets) on one of them were assembled in an argon glove box under ambient pressure. (See FIG. 7B). A thin layer of silicon paste (~0.2 mm) was spread over the perimeter of both plates, covering only 3 mm outer edges of the rectangular frame. This eliminates contact of the projector sheet with the paste when the two sides of the projector are assembled face-to-face and softly pressed together using suitable clips. The rigid ceramic plates evenly distribute the clamping force of the clips, pressing the rectangular frames against each other. The silicon paste transforms into an elastic rubber in 4 hours in air at room temperature.

Figure 8A:
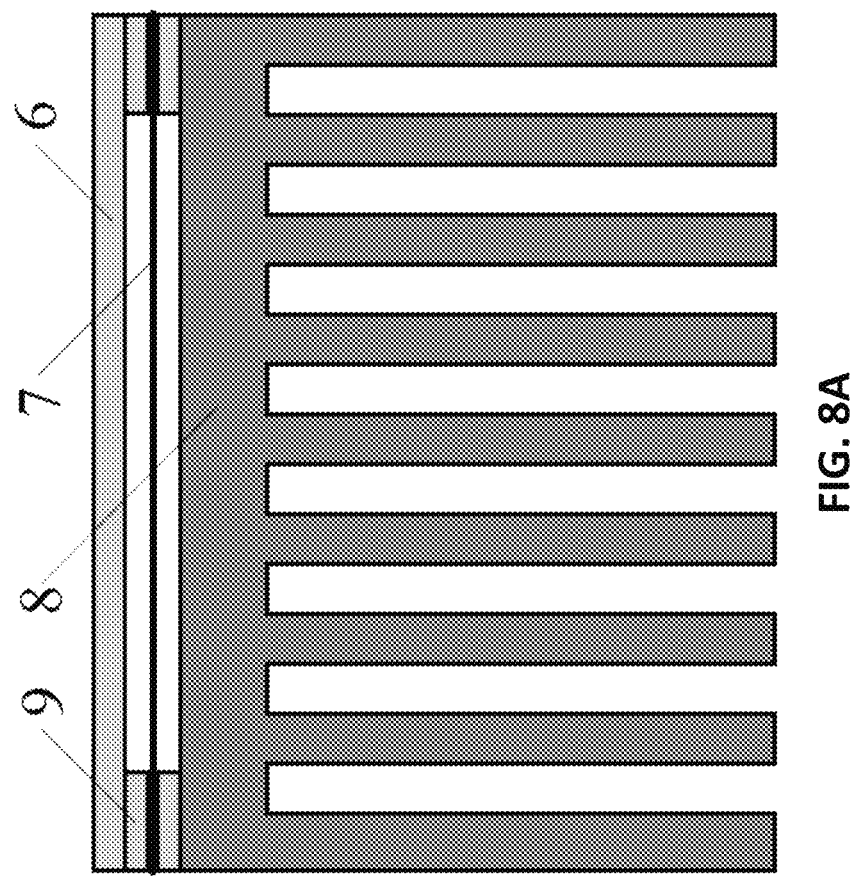
FIGS. 8A and 8B show, respectively, a schematic view and a picture of a TA device with enhanced heat dissipation. The TA projector includes the free-standing MWNT sheet suspended on the distance of 0.6 mm between a 5×5×0.015 cm$^3$ mica plate on the top and a heat sink on the bottom. The cylindrical object on top of the projector is a sensor for measuring acoustic emission.
Figure 8B:
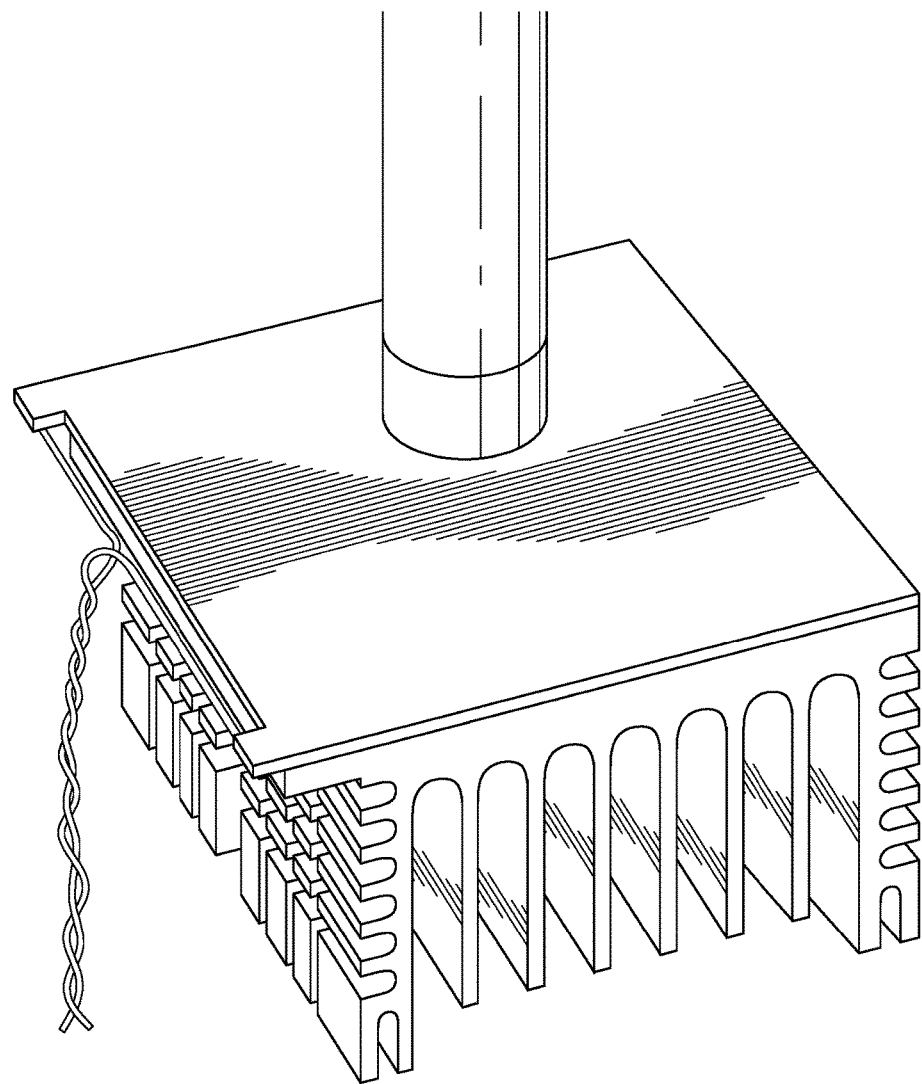

Restricted heat dissipation from the interior of the small volume enclosure is a main obstacle limiting the efficiency and power output of the TA projector. To reduce overheating of the encapsulated gas, the bottom plate (shown in another embodiment of the present invention in FIGS. 8A-8B) was substituted by the heat sink. For example, the thin thermoacoustic heater includes three superimposed MWNT sheets with a total resistance 338Ω that were encapsulated in argon gas between a mica plate (5×5×0.015 cm$^3$) on the top and the blackened aluminum heat sink radiator on the bottom. The edges of the assembly were sealed with silicon paste. The improved heat dissipation allows the application of up to 5.5 W (~0.2 W/cm$^2$) in air and 11 W underwater (0.44 W/cm$^2$) to this particular device without visible saturation of generated pressure waves. The resonance frequency, $f_r$=1696 Hz in air with Q=50, shifted underwater toward $f_r$=351 Hz with much lower quality factor, Q=6. The obtained power level of >130 dB re 20 μPa in air and >200 dB re 1 μPa underwater in the near field (r=5 cm) and >100 dB and >170 dB at the distance of 1 m, respectively (with the average temperature of encapsulated gas of ~50° C.), is promising for wide range of applications. The enhanced heat dissipation and use of light weight mica plates have increased the energy conversion efficiency to 0.3% in air, and to 1.5% underwater. Further increase of the sound intensity caused delamination of the layered mica plate structure.

Figure 9:
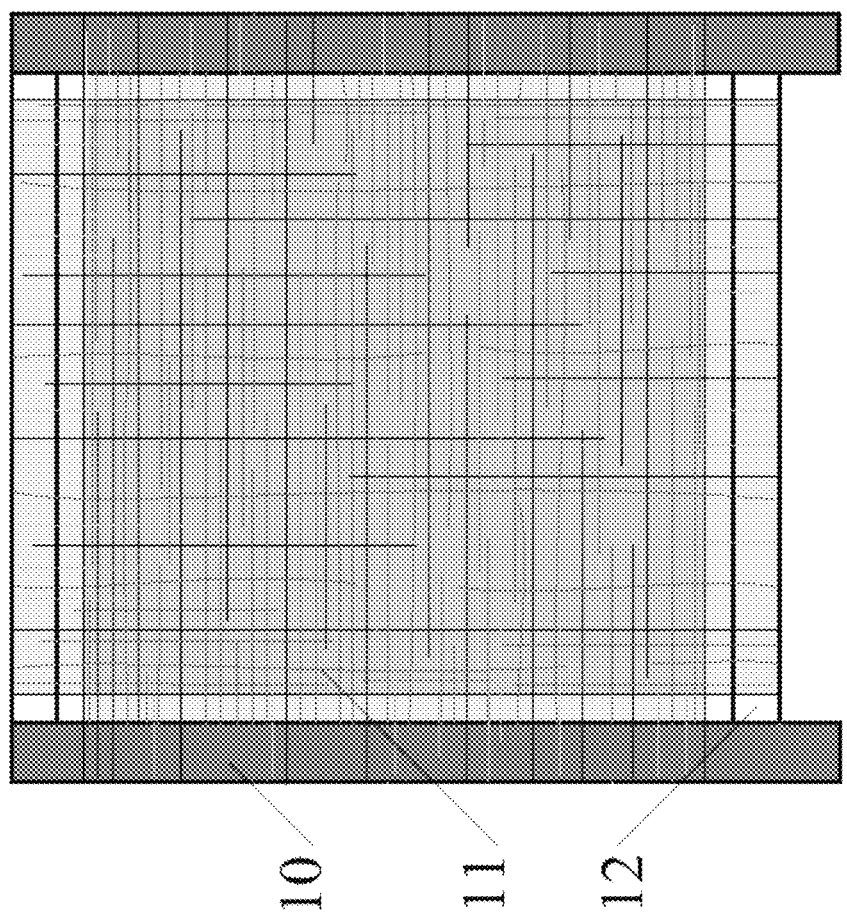
FIG. 9 is a schematic structural view of a TA device employing a framing element with two conductive electrodes 10 and aligned MWNT sheets 11 and 12 attached in orthogonal direction in accordance with an embodiment of the present invention.

The high voltage and current applied to narrow CNT strips or large bundles create lateral mechanical vibrations on the sheet edges and deteriorate the performance of TA devices [Aliev et al., Science 323, 1575 (2009)]. To avoid this problem, in other embodiments of the present invention, the carbon nanotube film have structures that eliminate this problem, for example, highly aligned MWNT sheets arranged in orthogonal direction, as shown schematically in FIG. 9. Referring to FIG. 9, the carbon nanotube structure includes a plurality of carbon nanotube sheets 11 arranged along a preferred orientation and connected to the conductive electrodes 10, as well as some carbon nanotube sheets that are arranged perpendicular to the first sheets and attached to nonconductive electrodes 12. The perpendicular aligned sheets reinforce the main sheets via van der Waals inter-sheet attractive forces, and thereby reduce the lateral vibration of the whole carbon nanotube sheet structure that is caused by static potential and Lorenz forces.

Figure 10:
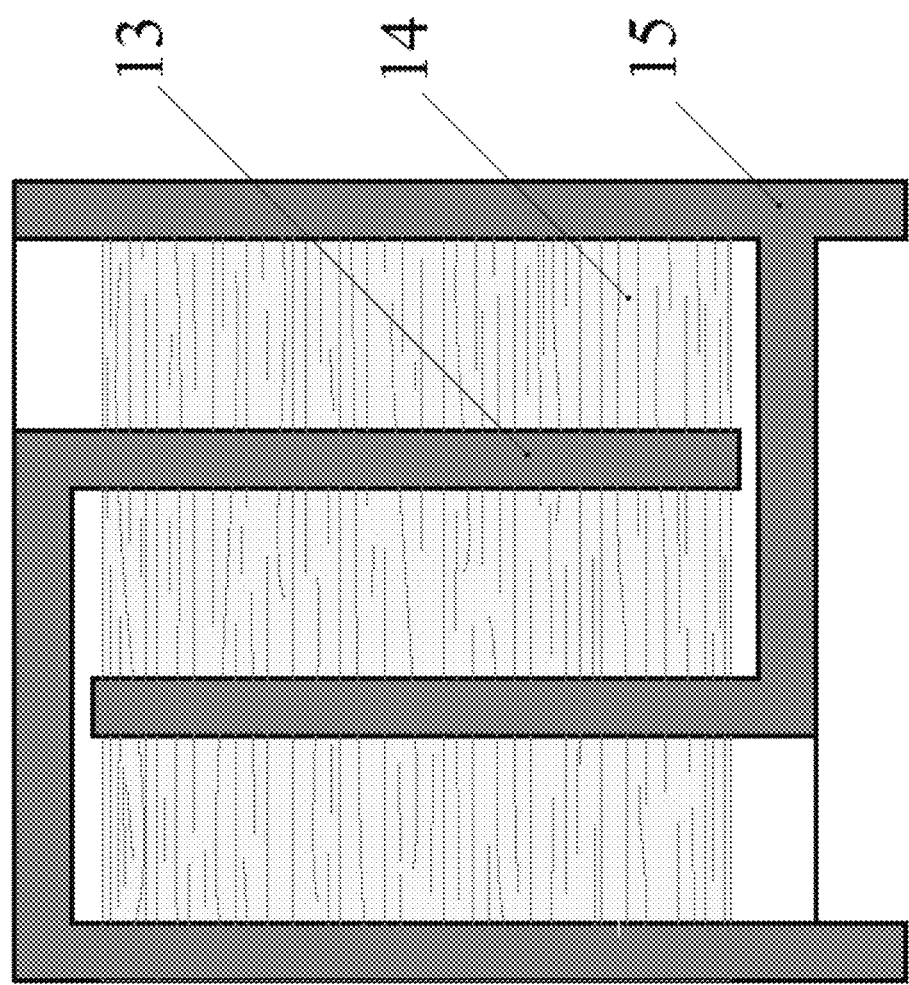
FIG. 10 is a schematic view of an arrangement of plurality of conductive electrodes 13 and 15 on insulating substrate 14 to reduce the overall resistance of a TA device according to an embodiment of the present invention.

In other embodiments of the present invention, the CNT structure can include at least one CNT film 14, or a plurality of CNT films, attached to conductive electrodes 13 and 15 having the comb structure shown in FIG. 10. The number of comb legs in each electrode determines the overall impedance of the TA device.

Figure 11:
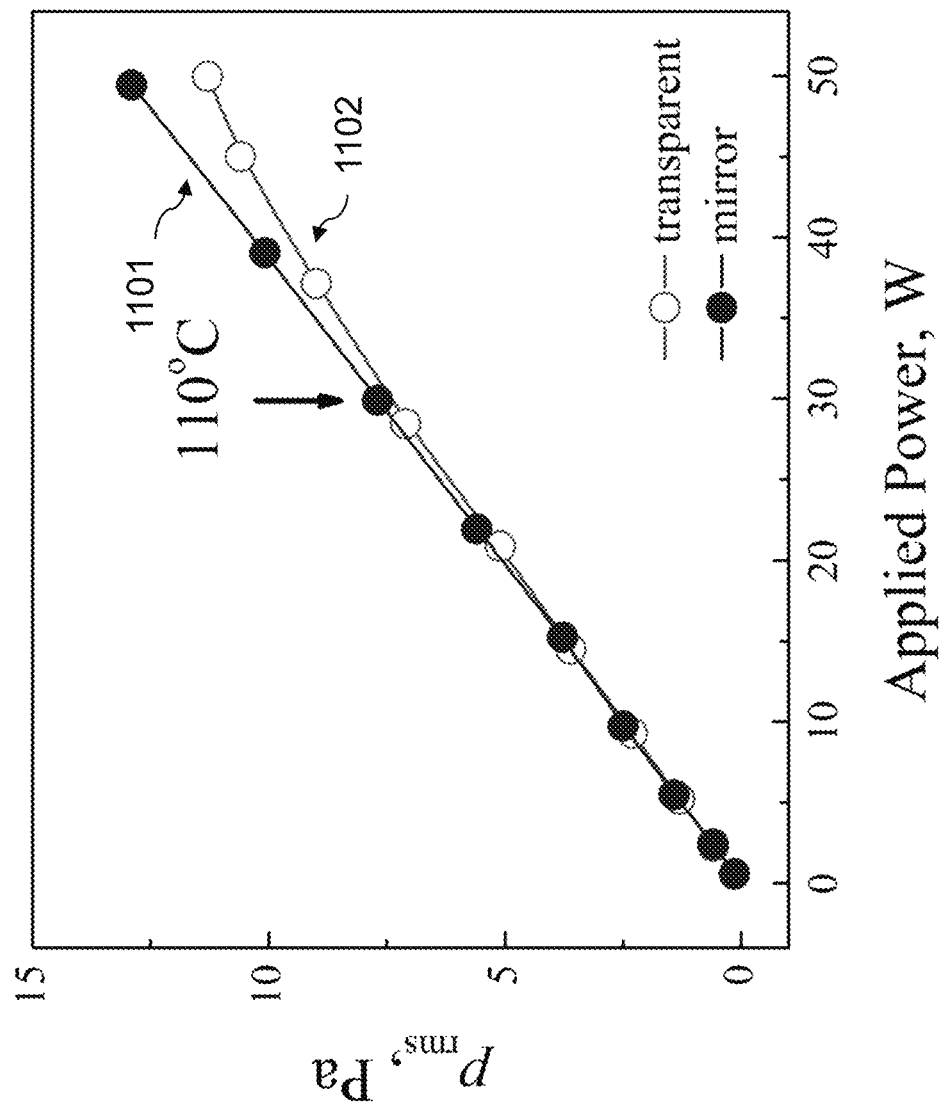
FIG. 11 is a comparison of TA sound projector performance (sound pressure versus applied power) for mirror coated (line 1101) and transparent (line 1102) quartz glass plates, (126×126×2.3 mm$^3$).

In another embodiment, one or more of the projector plates are coated with a metallic reflecting film to return part of the irradiated black body back to the carbon nanotube sheet. To obtain higher sound pressure and higher projector efficiency, the temperature modulation amplitude should be increased by increasing applied power $P_h$. However, MWNT sheets are near perfect black body emitters, which reduces TA projector performance at high temperatures. The blackbody radiation of the MWNT sheet does not contribute to the convective heating of the surrounding gas, the major contributor of heat transfer in TA transduction. To eliminate the loss of power, an infrared (IR) reflective (metallic) coating is deposited on at least one of the projector plates. Line 1101 of FIG. 11 shows that coating both projector plates with an IR reflecting coating (a 100 nm thick Ni film on 2.3 mm thick quartz glass plate) provides a thermo-acoustic projector whose sound pressure level linearly increases with input power output up to 50 W. The same device without IR coated plates shows (per line 1102 of FIG. 11) a decline from the linear dependence of $P_{rms}$ on applied power when this power is above 30 W, where the averaged sheet temperature $T_h$ exceeds 110° C. ($T_{peak}=2T_h-T_0=195°$ C.).

Figure 12A:
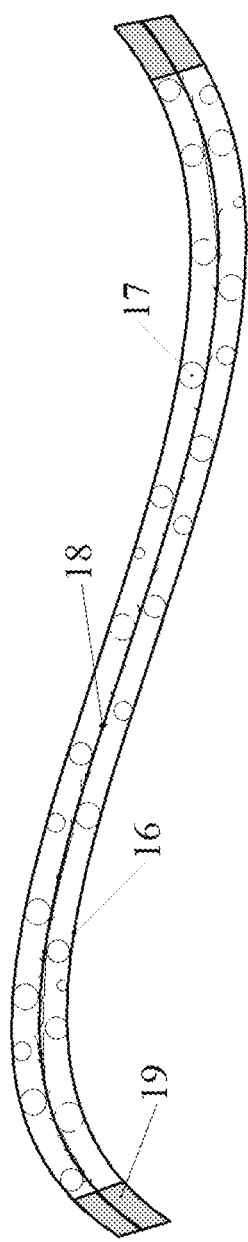
FIG. 12A depicts a schematic view of the structure of flexible transparent loudspeaker of the present invention that can be bended, pushed, and twisted.
Figure 12B:
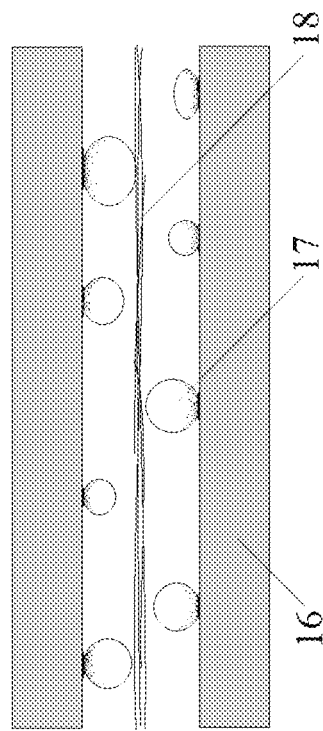
FIG. 12B depicts a magnified portion of the flexible transparent loudspeaker shown in FIG. 12A. The small insulating particles 17 deposited on the inner surfaces of vibrating membranes 16 (which act as vibrating plates) prevent the sticking of the freestanding carbon nanotube (CNT) film 18 to the surface of membranes.

In another embodiment of the present invention, the inner side of thin transparent vibrating plates are covered with small insulating particles, as shown in the schematic diagram of FIGS. 12A-12B. The purpose of these particles 17 is to prevent the sticking of free-standing CNT film to vibrating membranes during bending, pushing, twisting, or rolling the TA device. The small particles can be deposited by spray gun using an aqueous polyvinyl alcohol suspension.

Thereby, fabricated flexible TA device can be deployed on curved surfaces.

Another application of this transparent flexible TA loudspeaker is on the front panel of displays with touch-screen function. The size of insulating particles can be chosen from the conditions for optimizing the spacing between the MWNT sheet and vibrating plates, when taking into account the thermal diffusion length of the filling gas. The selected 10-20 µm spheres are optimal for argon and xenon filing gases. The material of particles includes, but is not limited to inorganic oxide spheres, like $SiO_2$, $TiO_2$, polymer spheres like Latex or others.

Figure 13:
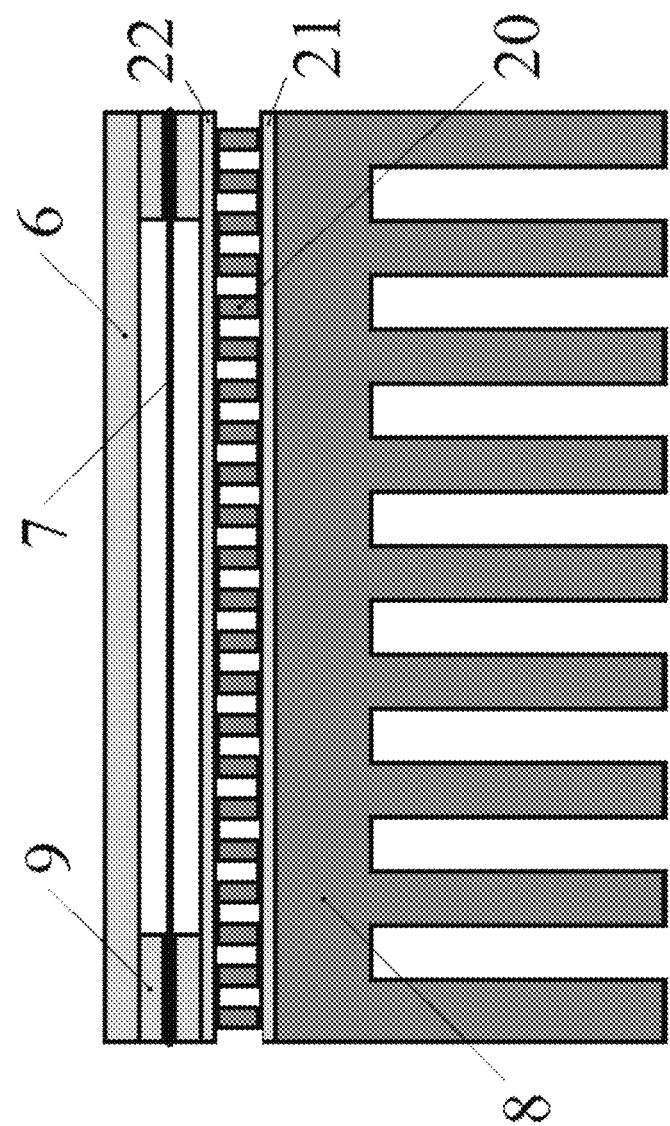
FIG. 13 is a schematic illustration of a thermoelectric module inserted between a TA projector and a passive radiator.

Since the thermoacoustic loudspeaker acts as a heat engine, the maximum energy conversion efficiency, i.e. the Carnot efficiency, relates to the ratio of cold reservoir and hot heater temperatures, $T_c$, and $T_h$, respectively. To increase the sound output of the thermoacoustic projector, in some embodiments of the present invention the thermoelectric effect is employed to manage the temperatures of hot heater source and cold sink. The efficiency of the TA projector approximately increases linearly with applied power $P_h$ for low or moderate applied power, where the applied electrical power increases the $T_h$ of the CNT heater and increases in $T_c$ are relatively small. However, at high applied power the ability of the encapsulated device to dissipate the created heat energy becomes insufficient and the generated acoustical power starts to saturate and even decrease because of a large increase in $T_c$. In such high power case a thermoelectric cooler can be deployed to decrease $T_c$ and thereby increase sound output. In an embodiment shown schematically in FIG. 13 a Peltier thermoelectric cooler 20 with cold plate 22 faced towards the TA heater is inserted between the TA projector 6, 7, 9 and a passive, radiator type cooler 8 of the embodiment shown in FIG. 8A. When a dc current is applied to the thermoelectric module 20, the cold plate 22 helps maintain the low temperature background inside of the TA enclosure, whereas the hot plate 21 dissipates heat energy through the passive radiator 8. The dc current level can be adjusted and synchronized with averaged ac signal applied to the TA projector to achieve a low temperature inside the enclosure and a high efficiency of the TA projector (relative to the input power used for heating the projector sheet).

In another embodiment of the present invention, which is shown in FIG. 14A, alternating thermoelectric p and n elements (27 and 28, respectively) are connected on top by suspended CNT sheet elements 23 and by regular metallic interconnects 24 on the opposite side. The direction of the applied voltage (which can be applied between points 1401 and 1402) is preferably chosen at all times to simultaneously generate heat on the CNT sheet interconnects and cool down the opposite electrodes, hence increasing the temperature gradient between the CNT sheet and the adjacent device face. FIG. 14B shows the case where a positive voltage (defined as one that heats the nanotube sheets via the thermoelectric effect, relative to the cooled underlying substrate) is obtained by superimposing a larger dc voltage on an arbitrary form ac voltage used to produce sound, $U_{dc}>U_{peak}$. Curve 1403 reflects the ac signal combined with the dc biasing. Maintaining a positive voltage at all times enables sound generation at the same frequency as the excitation ac signal (thereby avoiding a component of sound production at twice this frequency).

Figure 15:
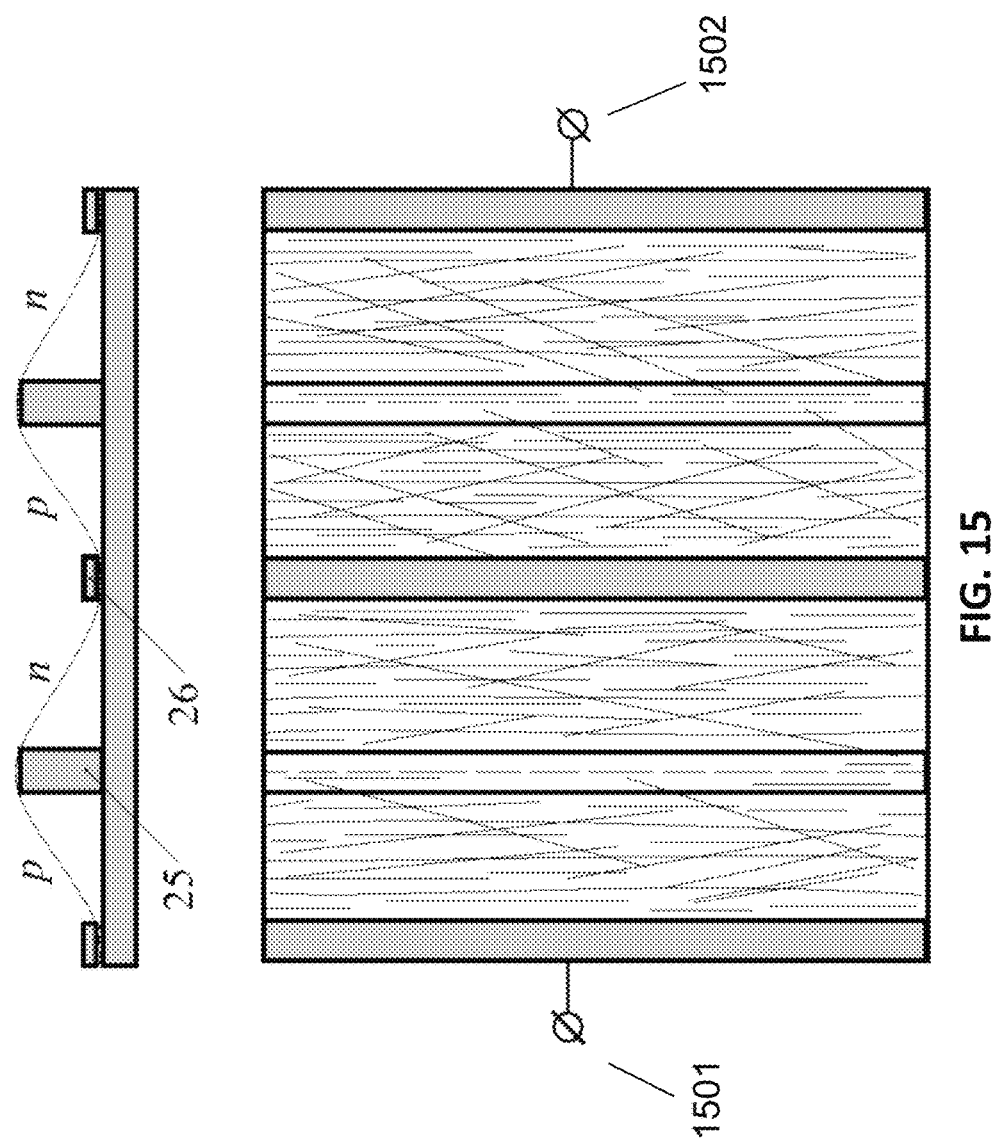
FIG. 15 is a schematic illustration of a thermoacoustic projector comprising p-doped and n-doped CNT sheets connected in series to create a thermoelectric module, which can be encapsulated in a gas-containing enclosure.

In another embodiment of the present invention, as shown in FIG. 15, p-doped and n-doped CNT sheets are alternatively connected with each other to provide thermoelectric p-n junctions, by overlapping on tall (typically about 0.1-0.2 mm high) electrode pillars 25 (hot ends) and at connections 26 on the substrate. The optionally multilayered CNT sheet strips of each type (n and p) are optionally superimposed on each other under small angle (approximately 3°5°) to the nanotube alignment direction to enhance electrical conductivity in the perpendicular direction. A dc current (or ac current biased with dc component) flowing perpendicular to the strips directions (which can be applied between points 1501 and 1502) can be used to heat the suspended parts and cool down interconnects pressed to the back-plate. The back-plate will help maintain the low temperature background of a usefully provided enclosure gas, whereas the suspended part of the CNT sheet will create a temperature gradient that alternates at the sound frequency.

For low frequency TA applications (f<1 kHz) the p and n doped CNT sheets can be substituted by polyacrylonitrile (PAN), polyimide (PI), or poly(D, L-lactic-co-glycolic acid) (PLGA) electrospun nanosheet, nanowovens, or other low heat capacity aerogel films or yarns coated by thermoelectric films.

Among the thermoelectric films most suitable for low power (near room temperature) applications are the complementary $Bi_2Te_3$ (n type) and $Sb_2Te_3$ (p type) pair. For high power (high temperature) applications, PbTe, SiGe and their compounds are more suitable.

Additional information of the present invention is included in A. E. Aliev et al., "Increasing The Efficiency Of Thermoacoustic Carbon Nanotube Sound Projectors," *Nanotechnology*, 2013, 24 (23), 235501, which paper is incorporated into this Application in its entirety.

The examples provided herein and in Attachment A are to more fully illustrate some of the embodiments of the present invention. It should be appreciated by those of skill in the art that the techniques disclosed in the examples which follow represent techniques discovered by the Applicant to function well in the practice of the invention, and thus can be considered to constitute exemplary modes for its practice. However, those of skill in the art should, in light of the present disclosure, appreciate that many changes can be made in the specific embodiments that are disclosed and still obtain a like or similar result without departing from the spirit and scope of the invention.

While embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. Accordingly, other embodiments are within the scope of the following claims. The scope of protection is not limited by the description set out above.

The disclosures of all patents, patent applications, and publications cited herein are hereby incorporated herein by reference in their entirety, to the extent that they provide exemplary, procedural, or other details supplementary to those set forth herein.

What is claimed is:

1. A thermoacoustic apparatus comprising:
   (a) a signal conditioning device; and
   (b) a thermoacoustic sound projector comprising
      (i) a planar nanotube structure, wherein the planar nanotube structure comprises at least one nanotube film selected from the group consisting of single-walled carbon nanotube films, few-walled carbon nanotube films, multi-walled carbon nanotube films, boron nitride nanotube films, and combinations thereof,
      (ii) at least two electrodes, wherein the planar nanotube structure is suspended between two of these electrodes,
      (iii) an encapsulated housing that encloses the planar nanotube structure, wherein
         (A) the encapsulated housing comprises a first relatively flat plate and a second relatively flat plate, and
         (B) the first relatively flat plate is capable of vibrating, and
      (iv) a gas medium that is contained within the encapsulated housing.

2. The thermoacoustic apparatus of claim 1, wherein the planar nanotube structure comprises a planar carbon nanotube structure.

3. The thermoacoustic apparatus of claim 2, wherein the planar carbon nanotube structure comprises a carbon nanotube film selected from the group consisting of single-walled carbon nanotube films, few-walled carbon nanotube films, multi-walled carbon nanotube films, and combinations thereof.

4. The thermoacoustic apparatus of claim 1, wherein the first relatively flat plate and the second relatively flat plate are symmetric.

5. The thermoacoustic apparatus of claim 1, wherein the second relatively flat plate is rigid such that the second relatively flat plate is essentially not capable of vibrating.

6. The thermoacoustic apparatus of claim 1 wherein
   (a) the at least one nanotube film is selected from the group consisting of a thin homogeneous carbon nanotube structure, a boron nitride nanotube film structure, and combinations thereof, and
   (b) the planar nanotube structure is a plurality of superimposed nanotube layers.

7. The thermoacoustic apparatus of claim 6, wherein
   (a) the at least one nanotube film comprises the thin homogeneous carbon nanotube structure, and
   (b) the at least one nanotube film has a high electrical conductivity.

8. The thermoacoustic apparatus of claim 6, wherein the plurality of superimposed carbon nanotube layers is operable to increase carbon nanotube-gas medium interaction and overall sound generation pressure.

9. The thermoacoustic apparatus of claim 6, wherein the plurality of superimposed carbon nanotube layers comprises more than five superimposed carbon nanotube layers.

10. The thermoacoustic apparatus of claim 6, wherein the plurality of superimposed carbon nanotube layers comprises less than five superimposed carbon nanotube layers.

11. The thermoacoustic apparatus of claim 1, wherein the planar nanotube structure has a positive coefficient of resistivity.

12. The thermoacoustic apparatus of claim 1, wherein the thermoacoustic sound projector further comprises
    (a) a framing element having two opposite conductive electrodes parallel to each other, and
    (b) aligned nanotube sheets attached to the framing element in orthogonal directions.

13. The thermoacoustic apparatus of claim 1, wherein
    (a) the planar nanotube structure and the first relatively flat plate (when in a relatively flat state) are separated by a spacing that is larger than the thermal diffusion length of the gas medium for a predetermined sound frequency range of the thermoacoustic apparatus,
    (b) the spacing is small enough to provide high conversion efficiency, and
    (c) the spacing is large enough that the planar nanotube structure does not make contact with the first relatively flat plate when the first relatively flat plate is vibrating.

14. The thermoacoustic apparatus of claim 1, wherein
    (a) the thermoacoustic sound projector further comprises an adhesive elastic ribbon that seals the encapsulated housing circumferentially,
    (b) the first relatively flat plate has a vibrating amplitude, and
    (c) the adhesive elastic ribbon has a thickness that is larger than the vibrating amplitude of the first relatively flat plate.

15. The thermoacoustic apparatus of claim 1, wherein at least one of the first relatively flat plate and the second relatively flat plate is operable to reflect infrared radiation emitted by a source selected from the group consisting of (a) hot nanotubes and (b) a material that includes dielectric ceramic plates that are coated with an infrared radiation reflective metallic film.

16. The thermoacoustic apparatus of claim 1, wherein
    (a) the first relatively flat plate has an inner side, and
    (b) the inner side of the relatively flat plate is coated with small oxide particles operable for preventing the sticking of the planar nanotube structure to the first relatively flat plate while being bended, pushed, or twisted.

17. The thermoacoustic apparatus of claim 1, wherein the sealed enclosure comprises two rigid flat plates that can withstand temperatures of at least 1000° C. and that have a Young modulus and density that provide a desired frequency and high resonance quality factor.

18. The thermoacoustic apparatus of claim 1, wherein the gas medium has a high heat capacity ratio ($\gamma = C_p/C_v$) of at least 1.5 and a heat capacity ($C_p$) of no more than about 200 J/(kg K).

19. The thermoacoustic apparatus of claim 1, wherein the planar nanotube structure and the two electrodes suspending the planar nanotube structure are electrically connected by direct attachment of the planar nanotube structure to the surface of the two electrodes with subsequent densification of the portion of the planar nanotube structure that overlaps the two electrodes.

20. The thermoacoustic apparatus of claim 1 further comprises
   (i) a modulator, and
   (ii) a dynamic carrier control (DCC) circuit for dynamically controlling the power supplied to the projector based on parameters of an input carrier signal for producing a desired sound signal, wherein
      (A) when the input carrier signal includes a low range of parameters, the DCC circuit is operable for reducing the power to the modulator in proportion to the amount of modulation required to modulate the range of parameters to produce the desired sound signal,
      (B) when there is no input carrier signal, the power supplied to the modulator is operable for turning off until the recognition of another input carrier signal.

21. The thermoacoustic apparatus of claim 1 further comprises
   (i) a modulator, and
   (ii) a dynamic carrier control (DCC) circuit for dynamically controlling the power supplied to the projector based on parameters of an input carrier signal for producing a desired sound signal, wherein power supplied to the modulator is in direct proportion to a range of parameters in order to produce or maintain the desired sound signal.

22. The thermoacoustic apparatus of claim 1 further comprises
   (i) a thermoacoustic modulator, and
   (ii) a dynamic carrier control (DCC) circuit for dynamically controlling the power supplied to the projector based on parameters of an input carrier signal for producing a desired sound signal, wherein
      (A) the signal conditioning device is operable for powering the thermoacoustic sound projector;
      (B) the thermoacoustic modulator is driven by input power that is a high frequency carrier signal whose amplitude is modulated by an input audio sound signal to provide the desired output sound signal from the thermoacoustic projector.

* * * * *